United States Patent
Tippur et al.

(10) Patent No.: US 11,629,951 B2
(45) Date of Patent: *Apr. 18, 2023

(54) DETERMINING GEOMETRIC CHARACTERISTICS OF REFLECTIVE SURFACES AND TRANSPARENT MATERIALS

(71) Applicant: Auburn University, Auburn, AL (US)

(72) Inventors: Hareesh V. Tippur, Auburn, AL (US); Chengyun Miao, Auburn, AL (US)

(73) Assignee: Auburn University, Auburn, AL (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/863,510

(22) Filed: Apr. 30, 2020

(65) Prior Publication Data

US 2020/0256670 A1     Aug. 13, 2020

Related U.S. Application Data

(63) Continuation-in-part of application No. 15/675,075, filed on Aug. 11, 2017, now Pat. No. 10,718,607, which is a continuation of application No. 14/326,856, filed on Jul. 9, 2014, now Pat. No. 9,759,553.

(60) Provisional application No. 62/896,328, filed on Sep. 5, 2019, provisional application No. 62/840,866, filed (Continued)

(51) Int. Cl.
*G01B 11/24* (2006.01)

(52) U.S. Cl.
CPC .................................. *G01B 11/24* (2013.01)

(58) Field of Classification Search
CPC ....... G01B 11/306; G01B 11/24; G01B 11/02; G01B 11/16; G01B 11/161; G01B 11/2408; G06T 2207/30121; G06T 7/001; H04N 7/18; Y02E 30/30
USPC ........................................................ 356/612
See application file for complete search history.

(56) References Cited

U.S. PATENT DOCUMENTS

| 2002/0044287 A1* | 4/2002 | Otaki ................... G01B 11/306 356/521 |
| 2010/0220186 A1* | 9/2010 | Chan ........................ H04N 7/18 348/126 |

(Continued)

OTHER PUBLICATIONS

"Higher sensitivity Digital Gradient Sensing configurations for quantitative visualization of stress gradients in transparent solids," Miao and Tippur, Optics and Lasers in Engineering, 108, 54-67 (2018).

(Continued)

*Primary Examiner* — Sunghee Y Gray
(74) *Attorney, Agent, or Firm* — Barnes & Thornburg LLP

(57) ABSTRACT

Illustrative embodiments of determining characteristics of reflective surfaces and transparent materials are disclosed. In at least one illustrative embodiment, a method of determining characteristics of transparent materials includes using a camera to capture light from a target structure with light regions and dark regions. Before the light is captured by the camera, it passes through a transparent specimen, reflects off of a reflective surface, and passes through the transparent specimen a second time. Deformations in the transparent specimen caused by, e.g., static or dynamic stresses deflect the light passing through it. The amount of the deflection can be used to determine the stresses in the specimen.

5 Claims, 16 Drawing Sheets

Related U.S. Application Data on Apr. 30, 2019, provisional application No. 61/844,157, filed on Jul. 9, 2013.

(56) References Cited

U.S. PATENT DOCUMENTS

| | | | |
|---|---|---|---|
| 2011/0310229 A1* | 12/2011 | Ueda | G01B 11/306 348/46 |
| 2012/0133761 A1* | 5/2012 | Cho | G01B 11/306 348/92 |
| 2012/0206729 A1* | 8/2012 | Seligson | G03F 7/70633 356/445 |
| 2018/0246006 A1* | 8/2018 | Likins, Jr. | G06T 7/254 |

OTHER PUBLICATIONS

"A simplified reflection-mode digital gradient sensing technique for measuring surface slopes, curvatures and topography," Miao and Tippur, Optics in Lasers and Engineering, 124, 105843 (2020).

* cited by examiner

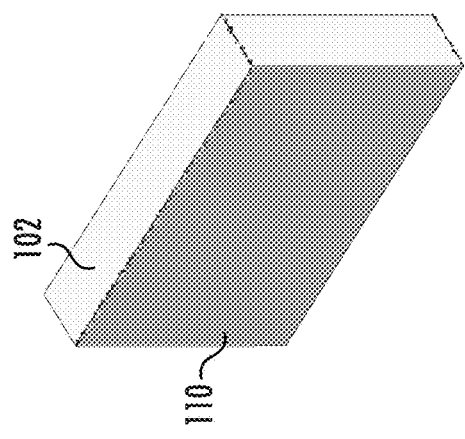
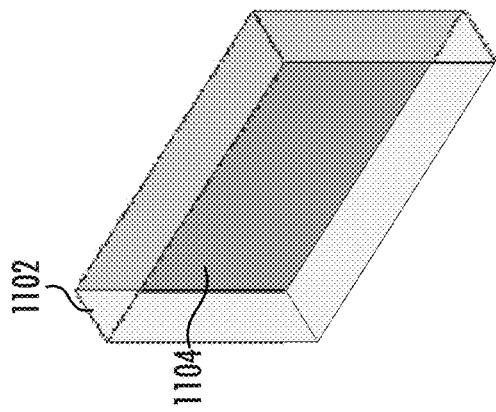
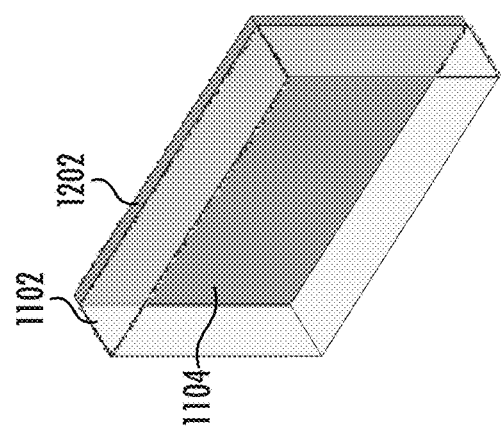
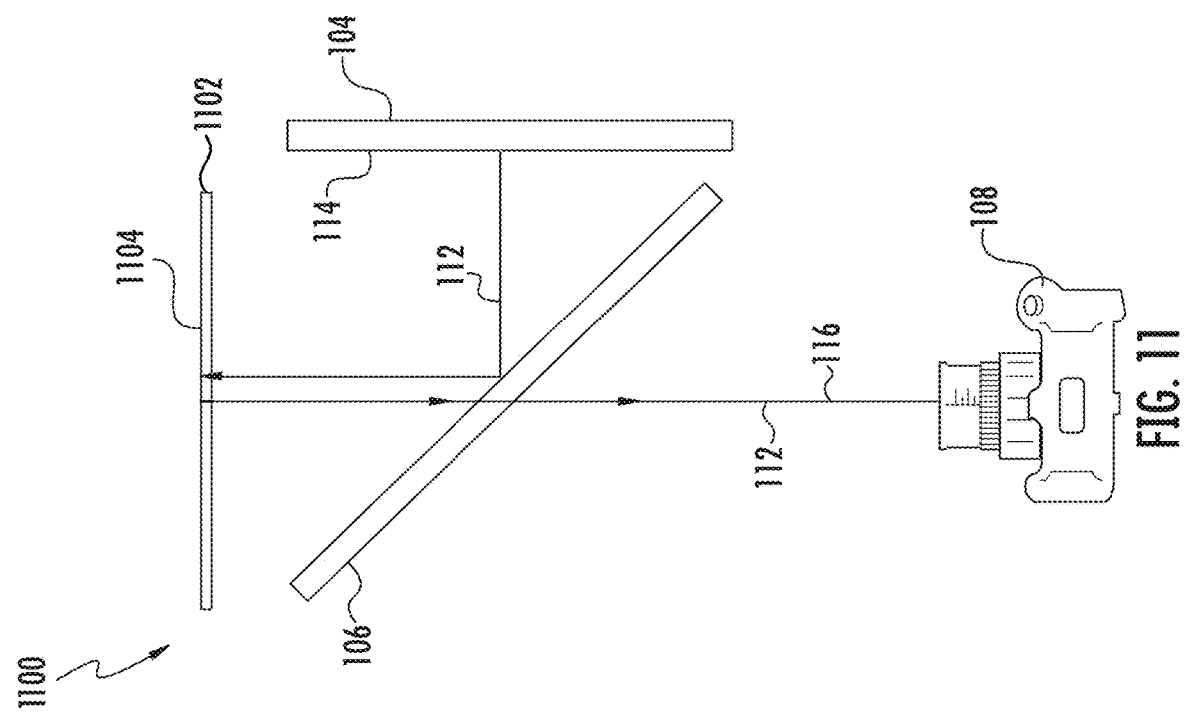

DETERMINING GEOMETRIC CHARACTERISTICS OF REFLECTIVE SURFACES AND TRANSPARENT MATERIALS

CROSS-REFERENCE TO RELATED APPLICATIONS

This application is a continuation-in-part of U.S. patent application Ser. No. 15/675,075, filed on Aug. 11, 2017, and entitled "Determining Geometric Characteristics of Reflective Surfaces," which is a divisional of U.S. patent application Ser. No. 14/326,856, filed on Jul. 9, 2014, and entitled "Determining Geometric Characteristics of Reflective Surfaces," which claims the benefit of U.S. Provisional Patent Application Ser. No. 61/844,157, filed on Jul. 9, 2013, and entitled "A Full-Field Digital Gradient Sensing Method for Optically Measuring Slopes and Curvatures of Thin Reflective Structures," the entire disclosures of which are incorporated herein by reference. This application claims the benefit of U.S. Provisional Patent Application Ser. No. 62/840,866, filed on Apr. 30, 2019, and entitled "Ultrahigh Sensitivity Vision-Based Whole-Field Optical Sensor for Metrology of Transparent Substrates," by Tippur V. Hareesh and Miao Chengyun, the entire disclosure of which is incorporated herein by reference. This application claims the benefit of U.S. Provisional Patent Application Ser. No. 62/896,328, filed on Sep. 5, 2019, and entitled "Simplified Digital Gradient Sensing Technique," by Tippur V. Hareesh and Miao Chengyun, the entire disclosure of which is incorporated herein by reference. This invention was made with government support under W911NF-16-1-0093 awarded by the Army Research Office. The government has certain rights in the invention.

BACKGROUND

Physical structures and, in particular, thin structures in aerospace, electronics, and other industries are often subjected to thermo-mechanical stresses and/or other loads that cause the surface of those structures to change. In other words, applied loads cause the surface topography and therefore the curvature of the structures to change. Such applied loads may be the result of a process over time (e.g., the drying of an epoxy or coating on the surface of the structure) or an instantaneously applied thermal or mechanical load (e.g., from another object applying a mechanical force to the structure over a particular region). Oftentimes, it is critical to a particular application to know whether the surface of the structure is flat or otherwise.

In the past, optical metrology tools such as shearing interferometry and moiré-based methods have been employed to quantify surface slopes and curvatures of a structure's surface. However, those methods generally require special conditions and/or destructive or contact testing of the structure to make such a determination. For example, depending on the particular implementation, the method may require Ronchi rulings or grid patterns, monochromatic coherent (e.g., laser) light, transparent structures, and/or coating the structure with a thin metallic film or other substance (e.g., having a specific pattern) in order to deduce the surface geometry.

SUMMARY

According to one aspect of the disclosure, a method for determining characteristics of transparent materials comprises illuminating a target structure, wherein the target structure comprises a plurality of light regions and a plurality of dark regions; capturing, by a camera, one or more images of the target structure using light from the target structure that passes through a transparent specimen a first time, reflects off of a reflective surface, and passes through the transparent specimen a second time; analyzing a position of each of the plurality of light regions and each of the plurality of dark regions in the one or more images; and determining, based on the analysis of the position of each of the plurality of light regions and each of the plurality of dark regions in the one or more images, an angular deflection of light through one or more regions of the transparent specimen.

In some embodiments, analyzing the one or more images of the target structure comprises correlating the plurality of light regions and the plurality of dark regions of a first image of the one or more images of the target structure with the plurality of light regions and the plurality of dark regions of a second image of the one or more images.

In some embodiments, the transparent specimen has a reflective coating on a surface of the transparent specimen, wherein the reflective coating is the reflective surface.

In some embodiments, a substrate comprising the reflective surface is adjacent the transparent specimen.

In some embodiments, the method may further include striking the specimen with a striker; wherein capturing the one or more images of the target structure comprises capturing a plurality of images of the target structure while stress waves caused by the striking of the specimen travel through the specimen.

In some embodiments, capturing the one or more images of the target structure comprises further comprises capturing at least one image of the target structure before stress waves caused by the striking of the specimen travel through the specimen, the method further comprising comparing the at least one image of the target structure captured before stress waves caused by the striking of the specimen travel through the specimen and the plurality of images of the target structure while stress waves caused by the striking of the specimen travel through the specimen to determine stresses caused by the stress waves caused by the striking of the specimen travel through the specimen.

In some embodiments, the specimen has a crack prior to being struck by the striker.

In some embodiments, capturing the one or more images of the target structure comprising capturing the one or more images of the target structure using light from the target structure that reflects off of a beamsplitter, passes through the transparent specimen a first time, reflects off of a reflective surface, passes through the transparent specimen a second time, and is transmitted through the beamsplitter.

According to one aspect of the disclosure, a system for determining characteristics of transparent materials comprises a transparent specimen comprising a front surface and a back surface; a substrate with a reflective surface, wherein the reflective surface of the substrate is adjacent the back surface of the specimen; a target structure comprising a surface with a plurality of light regions and a plurality of dark regions; and a camera configured to capture an image of the target structure using light from the target structure that passes through the transparent specimen and reflects off of the reflective surface.

In some embodiments, the system may further include a beamsplitter configured to direct light (i) from the target structure to the transparent specimen and (ii) from the transparent specimen to the camera.

In some embodiments, the system may further include a broad spectrum white light source configured to illuminate the target structure, wherein the camera is configured to capture the image using light from the broad spectrum white light source.

In some embodiments, the system may further include a striker configured to apply a force to the specimen.

In some embodiments, the camera is configured to capture the one or more images after the striker applies the force to the specimen.

In some embodiments, the specimen has a crack.

According to one aspect of the disclosure, a system for determining characteristics of transparent materials comprises a transparent specimen comprising a front surface and a back surface, wherein the back surface has a reflective coating; a target structure comprising a surface with a plurality of light regions and a plurality of dark regions; and a camera configured to capture an image of the target structure using light from the target structure that passes through the transparent specimen and reflects off of the reflective surface.

In some embodiments, the system may further include a beamsplitter configured to direct light (i) from the target structure to the transparent specimen and (ii) from the transparent specimen to the camera.

In some embodiments, the system may further include a broad spectrum white light source configured to illuminate the target structure, wherein the camera is configured to capture the image using light from the broad spectrum white light source.

In some embodiments, the system may further include a striker configured to apply a force to the specimen.

In some embodiments, the camera is configured to capture the one or more images after the striker applies the force to the specimen.

In some embodiments, the specimen has a crack.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 11 is a simplified schematic diagrams of one embodiment of a system for determining geometric characteristics of reflective surfaces;

FIG. 12A is simplified schematic diagrams of a specimen with a reflective front surface;

FIG. 12B is simplified schematic diagrams of a specimen with an adjacent reflective surface;

FIG. 12C is simplified schematic diagrams of a specimen with a reflective rear surface;

DETAILED DESCRIPTION OF THE DRAWINGS

Figure 1B:
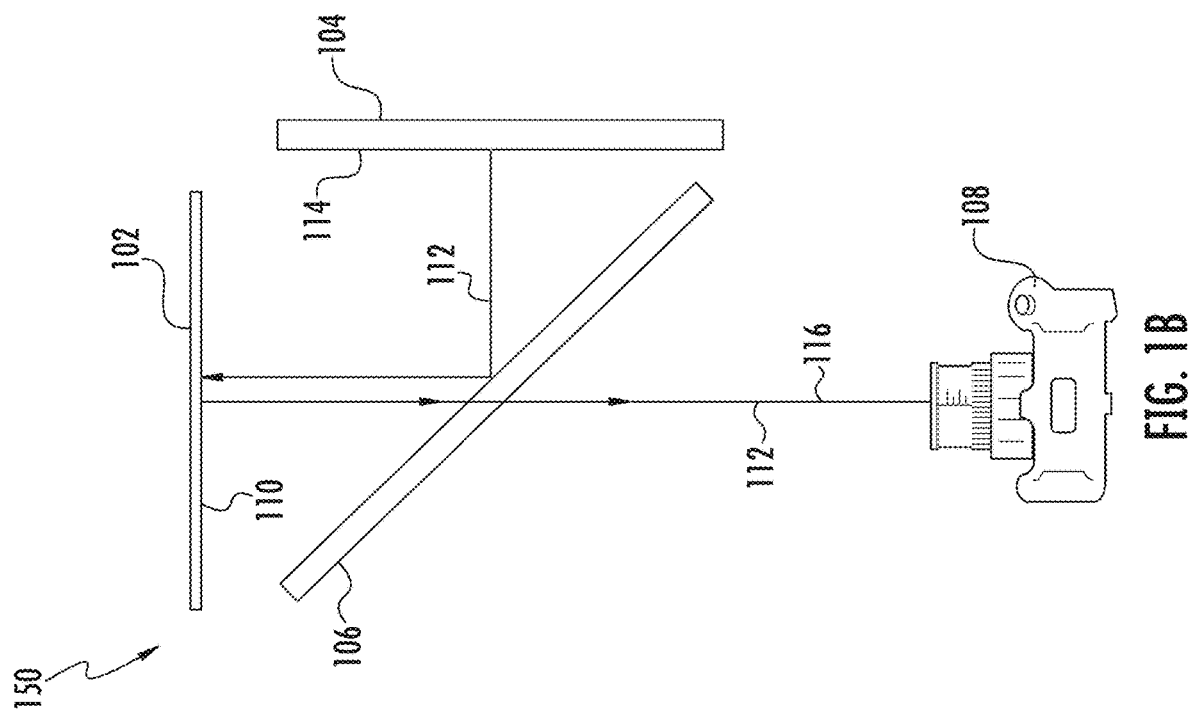
FIGS. 1A and 1B are simplified schematic diagrams of two embodiments of a system for determining geometric characteristics of reflective surfaces.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
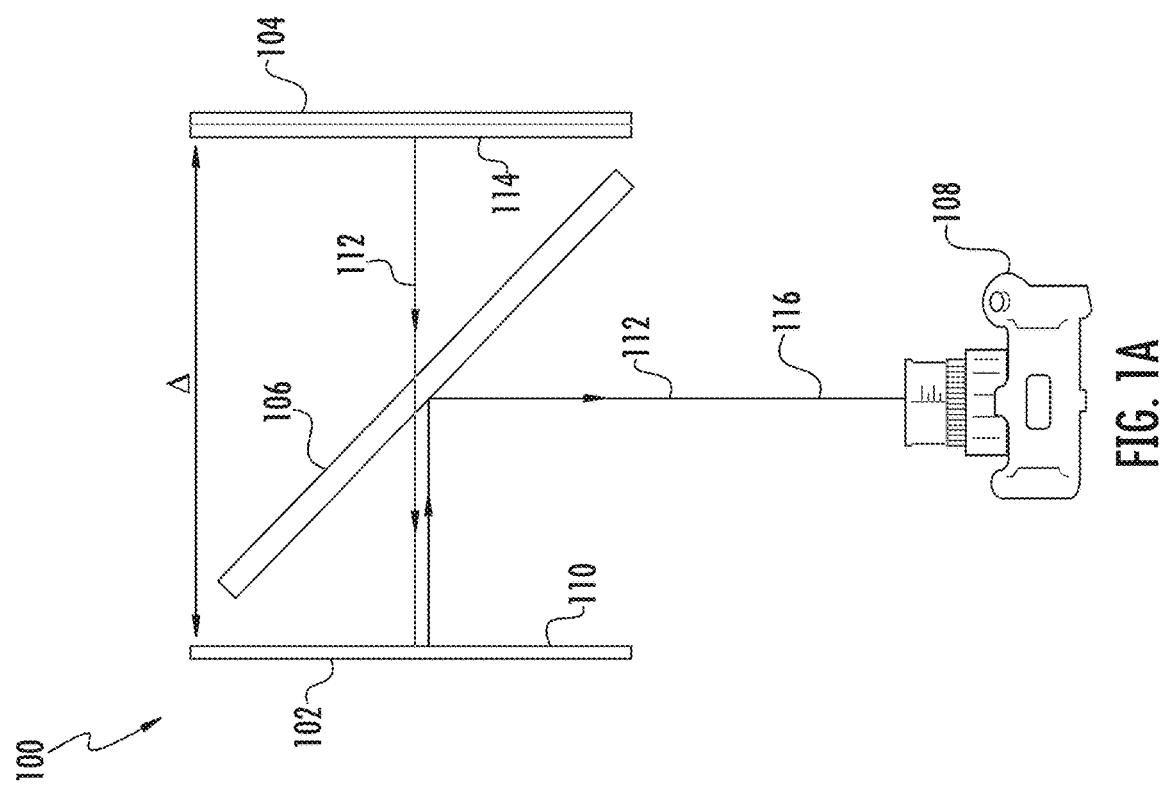

Referring now to FIG. 1A, a simplified schematic diagram of one illustrative embodiment of a system 100 for determining geometric characteristics of reflective surfaces is shown. As shown, the illustrative system 100 includes a specimen 102, a target structure 104, a beam splitter 106, and a camera 108. In use, as discussed in more detail below, the system 100 is configured to determine various geometric characteristics of a reflective surface 110 of the specimen 102. For example, the system 100 may determine the slope, curvature, twist, and/or surface topography of the specimen 102 resulting from an applied load (e.g., a process, environment-based load, mechanical load, or a combination thereof). More specifically, in the illustrative embodiment, the system 100 employs optical metrology (i.e., uses light as a measuring probe) to determine microscopic angulations associated with a slope of the reflective surface 110. In other embodiments, the system 100 may utilize photogeometry or another suitable technique for using electromagnetic waves (e.g., light) as a measuring probe.

In some embodiments, the system 100 may determine the amount by which the surface 110 of the specimen 102 has deformed relative to a flat surface, whereas in other embodiments, the system 100 may determine the amount by which the surface 110 has deformed relative to some other reference shape's surface (e.g., a previous shape of the specimen 102 prior to undergoing a process). In the illustrative embodiment, the system 100 makes those calculations and/or determinations using an imaging system 200 (see FIG. 2). As described below, in some embodiments, the imaging system 200 may include the camera 108, may be communicatively coupled to the camera 108, or may be embodied as the camera 108.

It should be appreciated that, in the illustrative embodiment, the system 100 determines the geometric characteristics of the reflective surface 110 of the specimen 102 without applying a coating (e.g., grid pattern) or otherwise damaging the specimen 102. As such, in such embodiments, the specimen 102 may be used for its designed purpose subsequent to the system 100 determining its geometric characteristics.

The specimen 102 may be embodied as any structure having a reflective surface 110 capable of reflecting an information carrier 112 (e.g., light) and that is otherwise suitable for use with the system 100 as described herein. As indicated above, the system 100 determines (with the imaging system 200) the geometric characteristics of the reflective surface 110 of the specimen 102. Accordingly, the specimen 102 may be any physical structure having a reflective surface 110 for which one may be interested in determining its shape. For example, in various embodiments, the specimen 102 may be embodied as a silicon wafer, a mirror, a solar panel, an antenna, or another reflective structure. In some embodiments, the reflective surface 110 of the specimen 102 is generally flat when a load (e.g., thermodynamic or mechanical) is not applied to the specimen 102. Additionally, the reflective surface 110 may be nominally reflective relative to the wavelength(s) of light 112 directed from the target structure 104 to the specimen 102 and to the camera 108. For example, in some embodiments, the "roughness" of the reflective surface 110 is less than those wavelengths of light 112.

Although the system 100 is generally described herein as involving reflected light 112, in other embodiments, the information carrier may be an electromagnetic wave 112 of any combination of wavelengths (e.g., a singleton or linear combination of wavelengths) provided that the reflective surface 110 (e.g., by itself or by means of coating it with a reflective material) can reflect that combination of electromagnetic waves 112 and its intensity pattern can be recorded by the camera 108 or another suitable sensor 210. In such embodiments, it should be appreciated that the system 100 includes a target structure 104 having corresponding features that can be reflected in the reflective surface 110 by those particular electromagnetic waves 112 (e.g., at those combinations of wavelengths) and a sensor 210 that is configured to sense and process (e.g., digitize) those electromagnetic waves 112. Additionally, a surface that appears visually to be a matte or non-reflective surface may be reflective at other wavelengths. For example, a black matte finished surface may not reflect "white light" but likely does reflect infrared waves. Accordingly, the system 100 may be configured for use with different electromagnetic waves 112 and corresponding target structures 104 (e.g., depending on the particular specimen 102). For ease of discussion, the system 100 is described herein primarily with respect to light 112 and corresponding light reflections; however, it should be appreciated that the techniques described herein may be similarly employed with different electromagnetic waves 112 and corresponding sensors 210 and target structures 104.

Figure 4B:
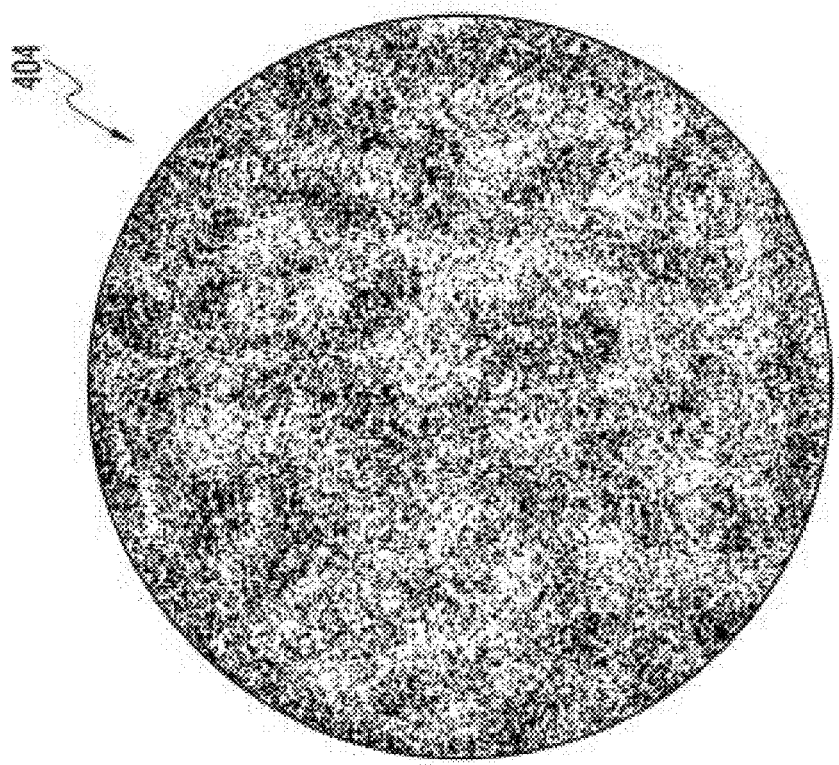
FIGS. 4A and 4B are exemplary images of the target structure captured by the camera of the systems of FIGS. 1A and 1B.
Figure 4A:
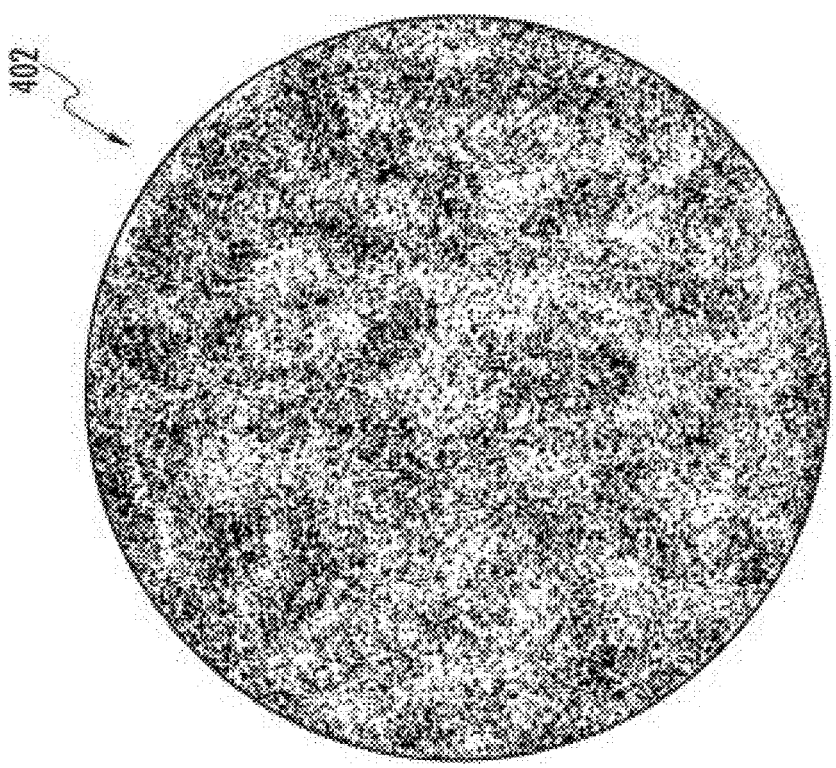

The illustrative target structure 104 includes a plurality of distinguishable feature points that may be captured in an image (by the camera 108) such that the captured image/data may be compared to a reference image/data to determine the displacement of the feature point locations in the captured image relative to their corresponding locations in the reference image. The target structure 104 may be illuminated by a broad-band white light source. In some embodiments, the target structure 104 is embodied as a target plate or subplane that is coated with a random black and white speckle "pattern" on a surface 114 facing the beam splitter 106 (see, for example, FIGS. 4A-B). In particular, in the illustrative embodiment, the feature points on the target structure 104 are nonlinearly and randomly distributed across the target structure 104. In other words, when photographed, the target structure 104 may be captured as a stochastic grayscale image of varying intensities. As discussed above, the target structure 104 may include feature points that may be reflected in the reflective surface 110 of the specimen 102 depending on the particular electromagnetic waves 112 employed with the system 100. For example, in embodiments involving infrared (IR) light 112, the surface 114 of the target structure 104 includes an "IR signature" that serves as the speckles or feature points.

The beam splitter 106 may be embodied as any structure configured to direct light 112 partially from the target structure 104 to the reflective surface 110 of the specimen 102 and from the reflective surface 110 of the specimen 102 to the camera 108. That is, the beam splitter 106 is configured to allow a portion of light 112 (e.g., half) to pass through the beam splitter 106 and to reflect another portion of light 112 off the beam splitter 106. For example, in some embodiments, the beam splitter 106 may be embodied as a partial mirror. The system 100 is configured to permit the camera 108 to capture images of the target surface 114 (e.g., the speckle pattern) reflected in the reflective surface 110 of the specimen 102 by virtue of light 112 passing through the beam splitter 106. In embodiments of the system 100 in which other electromagnetic waves 112 are utilized, the beam splitter 106 is configured to perform similar functions. In the illustrative embodiment, the beam splitter 106 is positioned at a forty-five degree angle relative to each of the reflective surface 110 of the specimen 102 (in an unloaded state) and the surface 114 of the target structure 104 as shown in FIG. 1A; however, in other embodiments, the beam splitter 106 may be positioned in another suitable orientation. In yet other embodiments, it will be appreciated that the specimen 102, the target structure 104, and the camera 108 may be oriented relative to one another such that the beam splitter 106 may be omitted from the system 100 and the techniques described herein may still be employed (e.g., using slightly modified geometric calculations).

The camera 108 may be embodied as any peripheral or integrated device suitable for capturing images, such as a still camera, a video camera, or other device capable of capturing images. For example, in embodiments involving IR light 112, the camera 108 may be embodied as an IR camera or be otherwise configured to capture the IR light 112. Further, in embodiments in which other electromagnetic waves 112 are utilized, the camera 108 may be replaced or supplemented with one or more sensors 210 configured to sense those waves 112. In the illustrative embodiment, the beam splitter 106 is positioned at a forty-five degree angle relative to an optical axis 116 of the camera 108 as shown in FIG. 1A. As described below, in some embodiments, the camera 108 may form a portion of an imaging system 200, which is not shown in FIG. 1A for clarity.

As shown in FIG. 1A, in the illustrative system 100, the target structure 104 is oriented within a plane that is parallel to a corresponding plane within which the reflective surface 110 of the specimen (in an unloaded state) is oriented and that is parallel to the optical axis 116 of the camera 108. Further, neither the target structure 104 nor the specimen 102 is positioned along the optical axis 116 of the camera 108. The distance, A, between the reflective surface 110 of the specimen 102 and the surface 114 of the target structure 104 is predetermined in the illustrative embodiment and may vary depending on the particular embodiment. The distance, A, may be used in determining various geometric characteristics of the reflective surface 110 as described below. The system 100 may be referred to as a reflection Digital Gradient Sensing (r-DGS).

It should be appreciated that a system 150 having the configuration shown in FIG. 1B may also be used to employ the techniques described herein. The system 150 of FIG. 1B may use the same components as the system 100 of FIG. 1A but arranged in a different orientation. In particular, in the illustrative system 150, the optical axis 116 of the camera 108 passes through the specimen 102, and the reflective surface 110 (in an unloaded state) is oriented orthogonally to the optical axis 116. Additionally, the target surface 114 is positioned within a plane parallel to the optical axis 116. It should be appreciated that, in each of the systems 100, 150, the distance, A, may be determined as the sum of the distance between the target surface 114 and the beam splitter 106 and the distance between the beam splitter 106 and the reflective surface 110. For ease of discussion, the techniques may be described herein with reference to the system 100 of FIG. 1A; however, it should be appreciated that the techniques equally apply to the system 150 of FIG. 1B. Further, in some embodiments, the components of the system 100 may be positioned in other suitable orientations relative to one another (e.g., using angles other than ninety and forty-five degrees).

Figure 2:
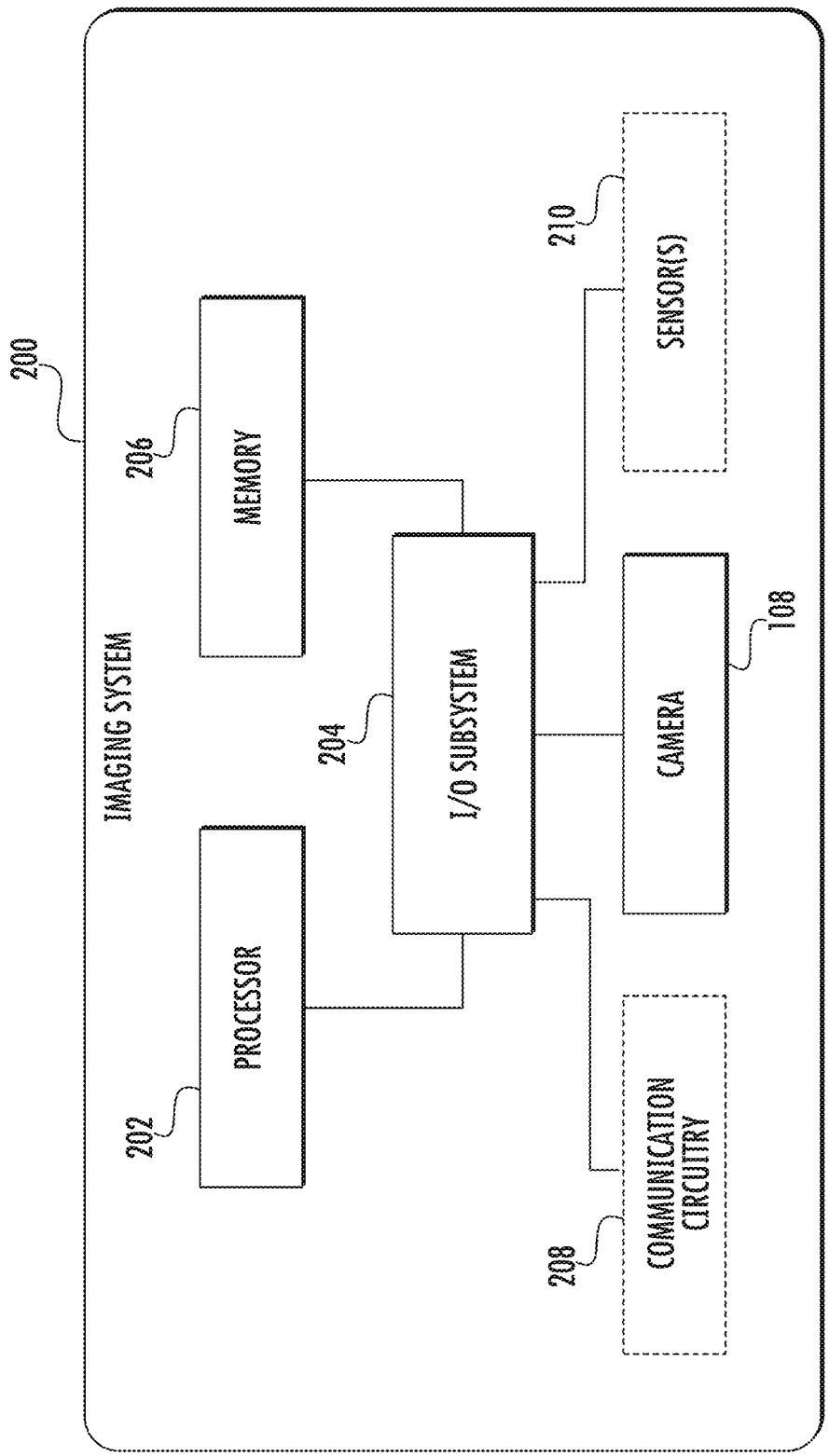
FIG. 2 is a simplified block diagram of an imaging system employed by the system of FIGS. 1A and 1B.

As indicated above, the system 100 may determine various geometric characteristics of the reflective surface 110 of the specimen (e.g., slopes, curvatures, twists, topology, etc.) with the imaging system 200. Referring now to FIG. 2, the illustrative imaging system 200 may be embodied as any type of computing device(s) capable of performing the functions described herein. The imaging system 200 includes a number of electronic components commonly associated with imaging systems. In the illustrative embodiment, the imaging system 200 includes a processor 202, an input/output ("I/O") subsystem 204, a memory 206, and the camera 108. As described below, the imaging system 200 may also include communication circuitry 208 (e.g., to communicate with remote devices). Further, in some embodiments, the imaging system 200 may include one or more sensors 210 (e.g., in addition to, or in place of, the camera 108). It will be appreciated that the imaging system 200 may include additional or different components, such as those commonly found in an imaging system and/or computing device. Additionally, in some embodiments, one or more of the illustrative components of the imaging system 200 may be incorporated in, or otherwise form a portion of, another component of the imaging system 200 (e.g., as with a microcontroller).

The processor 202 of the imaging system 200 may be embodied as any type of processor(s) capable of performing the functions described herein. For example, the processor 202 may be embodied as one or more single or multi-core processors, digital signal processors, microcontrollers, or other processors or processing/controlling circuits. Similarly, the memory 206 may be embodied as any type(s) of volatile or non-volatile memory or data storage device capable of performing the functions described herein. The memory 206 stores various data and software used during operation of the imaging system 200, such as operating systems, applications, programs, libraries, and drivers. For instance, the memory 206 may store instructions in the form of a software routine (or routines) which, when executed by the processor 202, allows the imaging system 200 to control operation of the imaging system 200 (e.g., to capture images with the camera 108) and process the images to compute the various surface characteristics of the specimen.

The memory 206 is communicatively coupled to the processor 202 via the I/O subsystem 204, which may be embodied as circuitry and/or components to facilitate I/O operations of the imaging system 200. For example, the I/O subsystem 204 may be embodied as, or otherwise include, memory controller hubs, I/O control hubs, firmware devices, communication links (e.g., point-to-point links, bus links, wires, cables, light guides, printed circuit board traces, etc.), and/or other components and subsystems to facilitate the I/O operations. In the illustrative embodiment, the I/O subsystem 204 includes an analog-to-digital ("A/D") converter, or the like, that converts analog signals from the camera 108 and the sensors 210 of the imaging system 200 into digital signals for use by the processor 202 (i.e., to digitize the sensed data). It should be appreciated that, if any one or more of the camera 108 and/or the sensors 210 associated with the imaging system 200 generate a digital output signal, the A/D converter may be bypassed. Similarly, the I/O subsystem 204 may include a digital-to-analog ("D/A") converter, or the like, that converts digital signals from the processor 202 into analog signals for use by various components of the imaging system 200.

In some embodiments, the data captured by the camera 108 and/or the sensors 210 may be transmitted to a remote computing device (e.g., a cloud computing device) for analysis. In other words, the determination of the geometric characteristics of the reflective surface 110 may be determined by a remote computing device based on the sensed data. Accordingly, the imaging system 200 may include communication circuitry 208, which may be embodied as any communication circuit, device, or collection thereof, capable of enabling communications between the imaging system 200 and remote devices. The communication circuitry 208 may be configured to use any one or more communication technology (e.g., wireless or wired communications) and associated protocols (e.g., Ethernet, Bluetooth®, Wi-Fi®, WiMAX, etc.) to effect such communication.

As indicated above, the system 100 may be configured to use any electromagnetic wave 112 that may be reflected off the reflective surface 110 of the specimen 102. In such embodiments, the system 100 may utilize sensors 210, different from the camera 108, to capture the electromagnetic waves 112. As such, the sensors 210 may be embodied as any type of sensors suitable for capturing such electromagnetic waves 112.

Figure 3A:
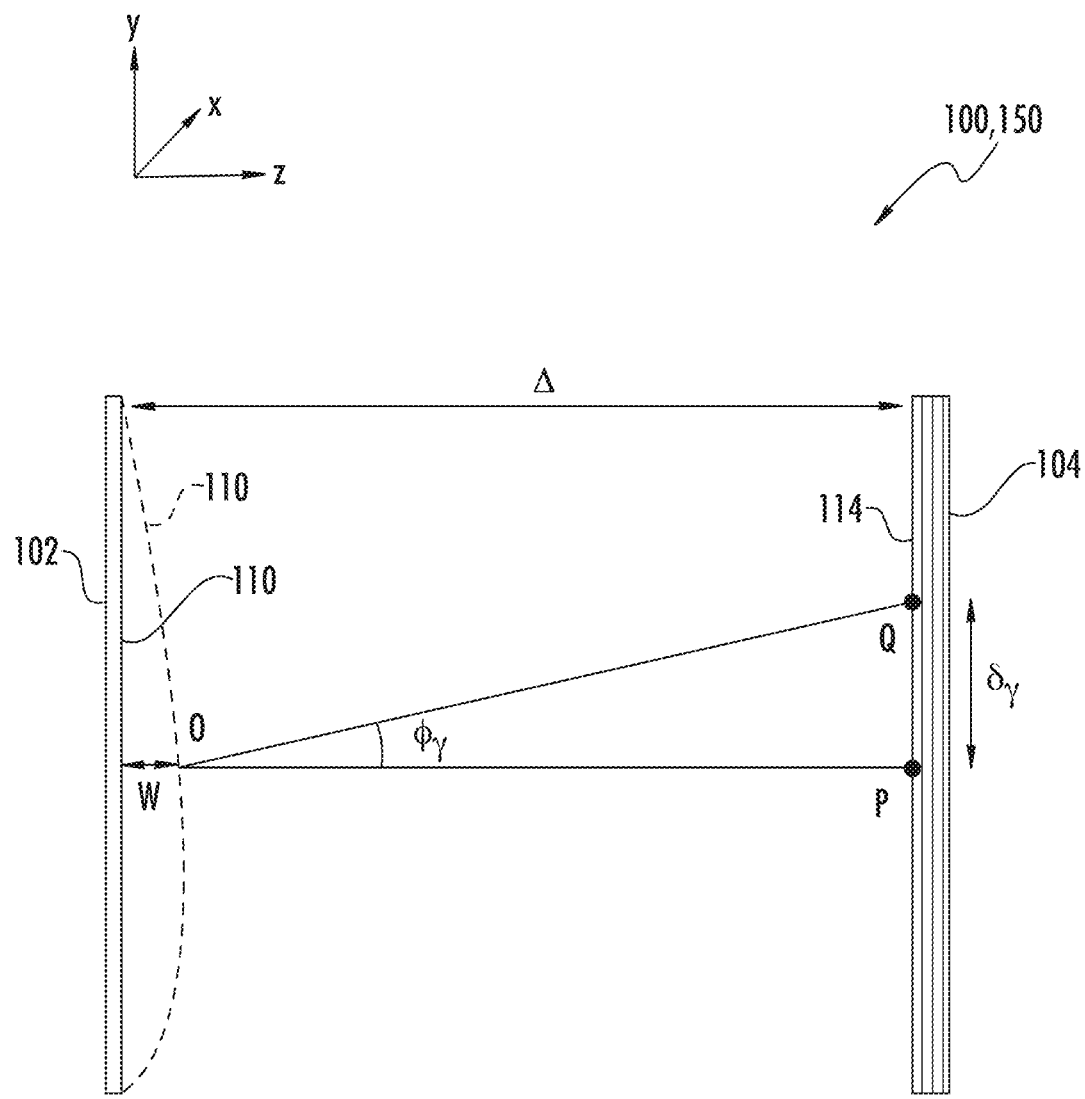
FIG. 3A is a simplified two-dimensional spatial diagram illustrating an optical path between a target structure and a specimen of the systems of FIGS. 1A and 1B.
Figure 3B:
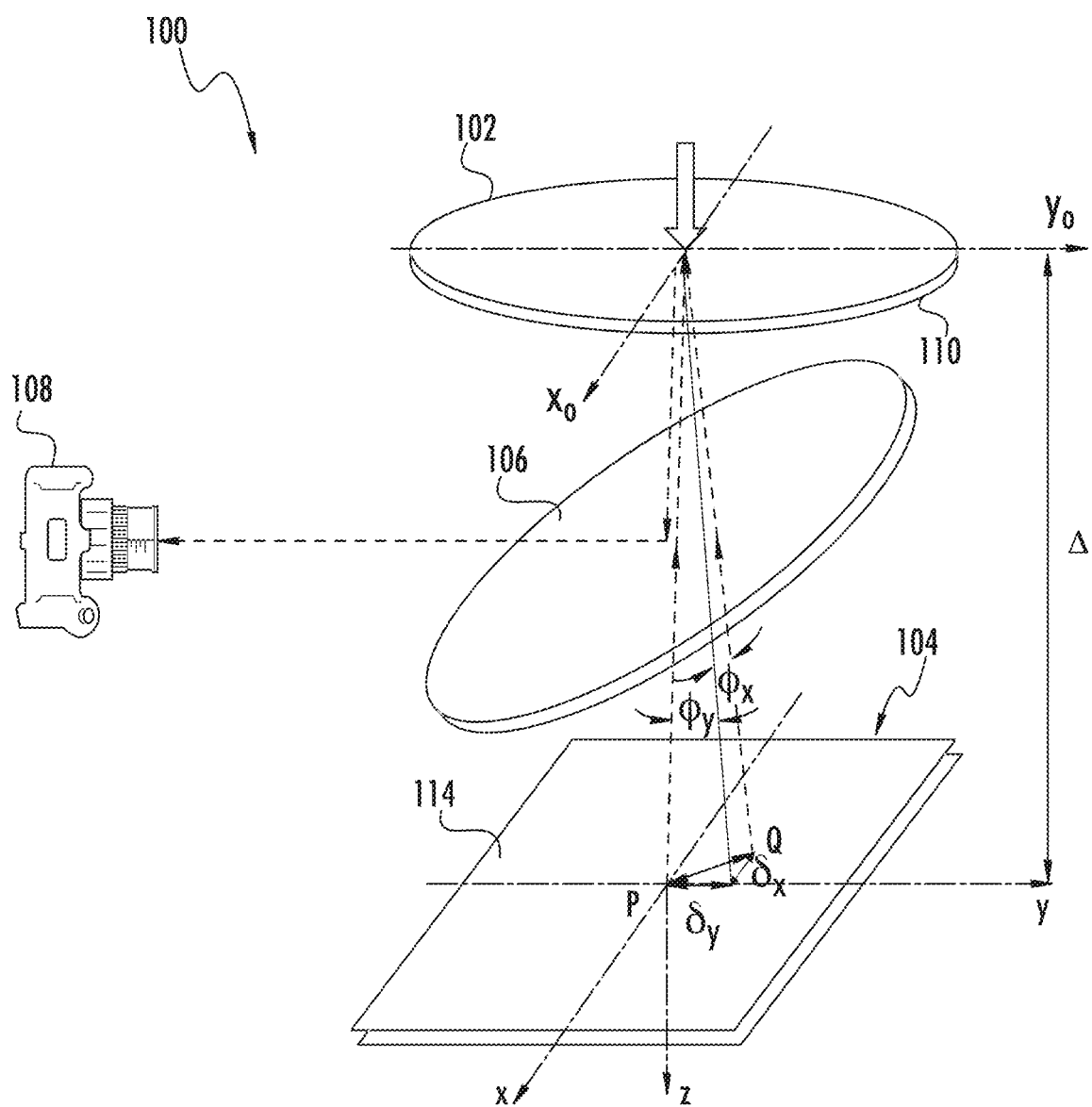
FIG. 3B is a simplified three-dimensional spatial diagram illustrating an optical path from the target structure to the camera of the system of FIG. 1A.

Referring now to FIG. 3A, a simplified spatial diagram illustrating optical paths between the target structure 104 and the specimen 102 of the system 100 and corresponding geometric relationships is shown. Although the system 100 is only shown in two dimensions (i.e., as a top view), it should be appreciated that the target structure 104 and the specimen 102 are generally three-dimensional structures. For example, it will be appreciated that FIG. 3B is a three-dimensional representation of FIG. 3A. More specifically, FIG. 3B illustrates the optical path from the target structure 104 to the camera 108 in at least one embodiment of the system 100 of FIG. 1A. In the illustrative embodiment, the reflective surface 110 of the specimen 102 is generally flat and undeformed when a load is not applied to the surface 110. In such circumstances, the incident and reflected rays of the reflective surface 110 of the specimen 102 are collinear and may be considered to be parallel to the optical axis 116 of the camera 108 due to the beam splitter 106. In other words, $\overline{OP}$ is coincident with $\overline{OQ}$.

When the reflective surface 110 undergoes an out-of-plane deformation, w, (e.g., a "bulge" due to an applied load), the light ray $\overline{OP}$ is deflected to $\overline{OQ}$ by an angle $\phi_y$, which is equal to the angle of incidence plus the angle of reflection. Similarly, $\overline{OP}$ is deflected by an angle $\phi_x$ in an orthogonal direction (e.g., in an x-z plane). Accordingly, the point Q is brought into focus instead of the point P, which was originally in focus. That is, after deformation, the point P is replaced by the point Q, so the point Q is now captured through the point O on the reflective surface 110. In other words, the camera 108 captures the feature point(s) located at point Q on the target structure 104 for the particular image pixel rather than the feature point(s) located at point P on the target structure 104. Of course, it should be appreciated that the other image pixels captured by camera 108 may similarly vary due to the deflection.

As indicated above, the surface 114 of the target structure 104 includes a plurality of feature points that are, for example, stochastically distributed. Accordingly, in the illustrative embodiment, the imaging system 200 applies a digital image correlation (DIC) algorithm to determine the displacements $\delta_y$ and/or $\delta_x$, which are the relative displacements associated with the deflections by the angles $\phi_y$ and $\phi_x$ discussed above. More specifically, in order to determine those displacements $\delta_y$ and/or $\delta_x$, the imaging system 200 compares an image 402 captured by the camera 108 of the target surface 114 during (or after) the applied load (see FIG. 4A) to a reference image 404 of the target surface 114 prior to or otherwise without enduring the applied load (see FIG. 4B). Some illustrative DIC algorithms are described in Chen et al., "Digital Speckle-Displacement Measurement Using a Complex Spectrum Method," 32 Appl. Opt. 1839-49 (1993); Chu et al., "Application of Digital Image Correlation Techniques to Experimental Mechanics," 25 Exp. Mech. 232-44 (1985); and Sutton et al., "Image Correlation for Shape, Motion, and Deformation Measurements," Berlin: Springer (2009). In other embodiments, the imaging system 200 may utilize any other suitable feature matching algorithm (instead of DIC) for determining the relative displacements.

It should be appreciated that the feature points represented in the image 402 are shifted relative to the feature points in the reference image 404 due to the deformation of the reflective surface 110 of the specimen 102. In some embodiments, the reference image 404 may be captured by the camera 108 prior to the reflective surface 110 enduring the applied load. In other embodiments, the specimen 102 may be temporarily replaced with, for example, an optical trial of the general shape (e.g., flat) against which the shape of the reflective surface 110 of the specimen 102 is to be compared, and the camera 108 captures the reference image 404 of the target surface 114 reflected in the optical trial rather than the reflective surface 110. In yet other embodiments, the reference image 404 may be otherwise generated or provided (e.g., as a standalone reference image associated with the target surface 114). Of course, in embodiments in which images are not used in the system 100, 150, other suitable reference data may be used.

It should be appreciated that, in some embodiments, each of the two images 402, 404 is stored and/or processed as a two-dimensional array of light intensities. For example, in a monochromatic (i.e., grayscale) digital image, each pixel represents an intensity value of the captured light 112 (e.g., between 0 and 255 for an 8-bit image). In the illustrative embodiment, the imaging system 200 analyzes the images 402, 404 (e.g., using DIC) to determine a distance that each point has been displaced (e.g., in the x and/or y direction(s)) in the captured image 402 relative to the reference image 404. In other words, the imaging system 200 may determine how much each point has been displaced relative to its location with the specimen 102 in its original, undeformed state. In some embodiments, the displacements $\delta_y$ and $\delta_x$ are generated by the imaging system 200 as distance values in a two-dimensional array. As indicated above, such displacements are a result of light 112 incident on the reflective surface 110 of the specimen 102 being deflected proportionally to the curvature or slope of the surface 110.

In the illustrative embodiment, the imaging system 200 calculates the local surface slopes $$\frac{\partial w}{\partial x} \text{ and } \frac{\partial w}{\partial y}$$

according to $$\frac{\partial w}{\partial x:y} = \frac{1}{2}\tan(\phi_{x:y}).$$

However, as discussed above, the system 100, 150 is configured to determine microscale changes in the slope of the reflective surface 110 and therefore $$\tan(\phi_{x:y}) \cong \frac{\delta_{x:y}}{\Delta}$$

due to the small angles. Accordingly, the imaging system 200 may calculate the local surface slopes $$\frac{\partial w}{\partial x} \text{ and } \frac{\partial w}{\partial y}$$

according to $$\frac{\partial w}{\partial x:y} \cong \frac{1}{2}\frac{\delta_{x:y}}{\Delta}$$

based on the displacements $\delta^y$ and $\delta_x$ and the distance $\Delta$ between the reflective surface 110 and the target surface 114. That is, the imaging system 200 may calculate the slope $$\frac{\partial w}{\partial x}$$

of the reflective surface 110 in the x-direction as $$\frac{1}{2}\frac{\delta_x}{\Delta}$$

and the slope $$\frac{\partial w}{\partial y}$$

of the reflective surface 110 in the y-direction as $$\frac{1}{2}\frac{\delta_y}{\Delta}.$$

Similarly, the deflection angles can be expressed as $$\phi_{x:y} = 2\frac{\partial w}{\partial(x:y)}.$$

Figure 5B:
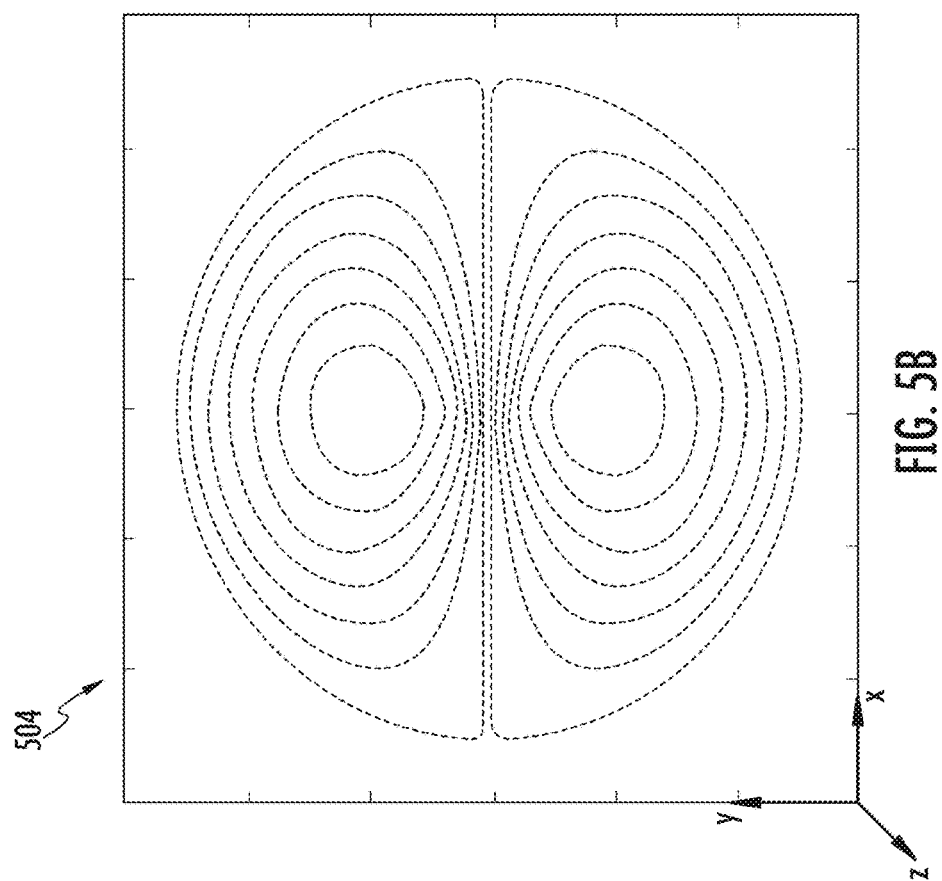
FIGS. 5A and 5B are simplified contour diagrams of determined slopes of a surface of the specimen of FIGS. 1A and 1B.
Figure 5A:
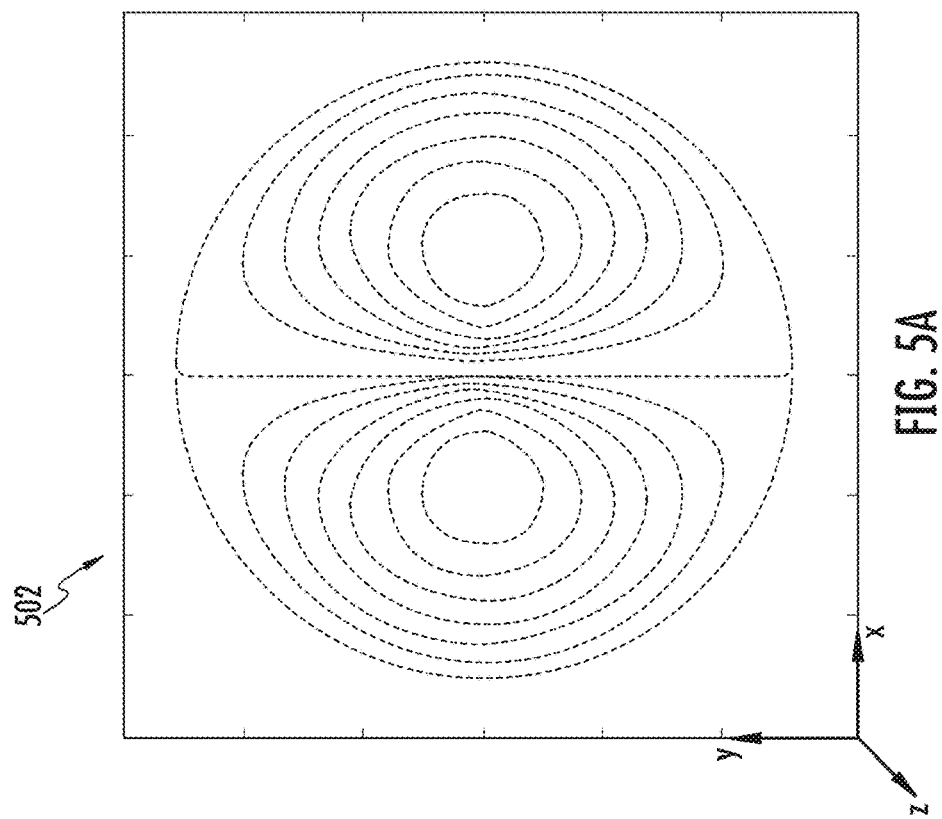

In the illustrative embodiment, coordinates on a plane coincident with the reflective surface 110 of the specimen 102 (in an unloaded state) are utilized to determine the slopes, but the displacements are determined based on coordinates of the surface 114 of the target structure 104. Accordingly, in such embodiments, the imaging system 200 may utilize a linear mapping of coordinates between the planes of the reflective surface 110 and the target surface 114 to account for this. At least one technique for doing so is described in Periasamy, et al., "A Full-Field Digital Gradient Sensing Method for Evaluating Stress Gradients in Transparent Solids," 51 Appl. Opt. 2088-97 (2012). Further, in some embodiments, the determined slopes $$\frac{\partial w}{\partial x} \text{ and } \frac{\partial w}{\partial y}$$

may be stored by the imaging system 200 as, for example, a two-dimensional array of slope values and may be represented visually by contour diagrams 502, 504, respectively, as shown in FIGS. 5A and 5B.

It should be appreciated that the diagrams 502, 504 of FIGS. 5A-B (as well as diagrams 602, 604, 702, 704, 802, 808 of FIGS. 6A-8B, described further below) correspond with the geometry associated with a mechanical load being applied to the center of a circular silicon wafer. In other words, a small (e.g., microscale) bulge is identified by the imaging system 200 due to the mechanical load. It should further be appreciated that, unlike optical interferometric and moiré methods, the imaging system 200 permits the slope fields to be determined using a single pair of data corresponding with the reflective surface 110 in undeformed and deformed states.

Figure 6B:
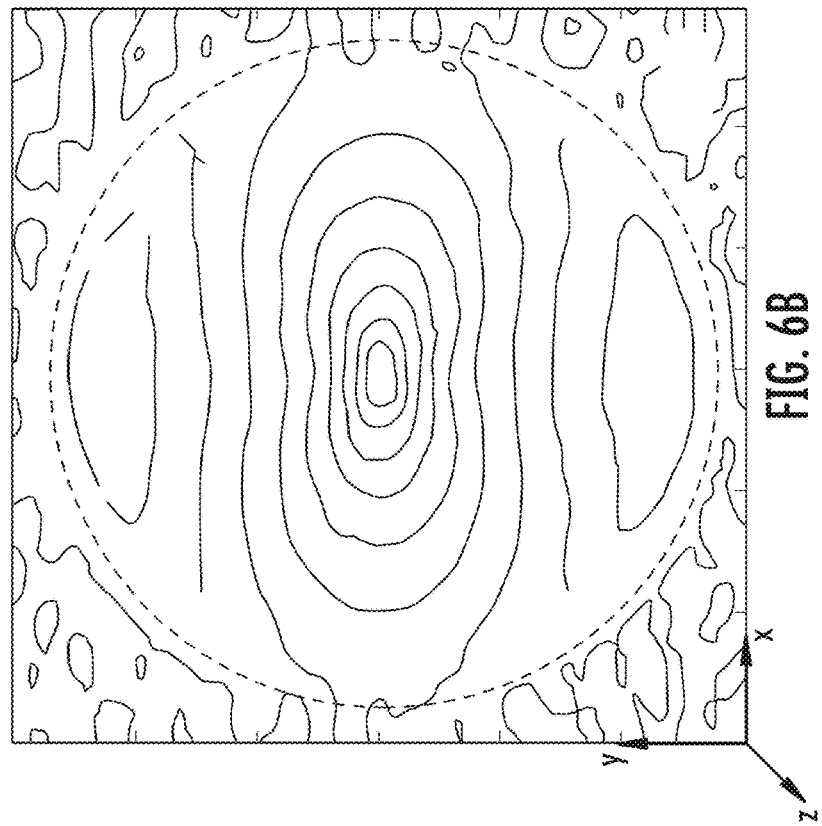
FIGS. 6A and 6B are simplified contour diagrams of determined curvatures of the surface of the specimen of FIGS. 1A and 1B.
Figure 6A:
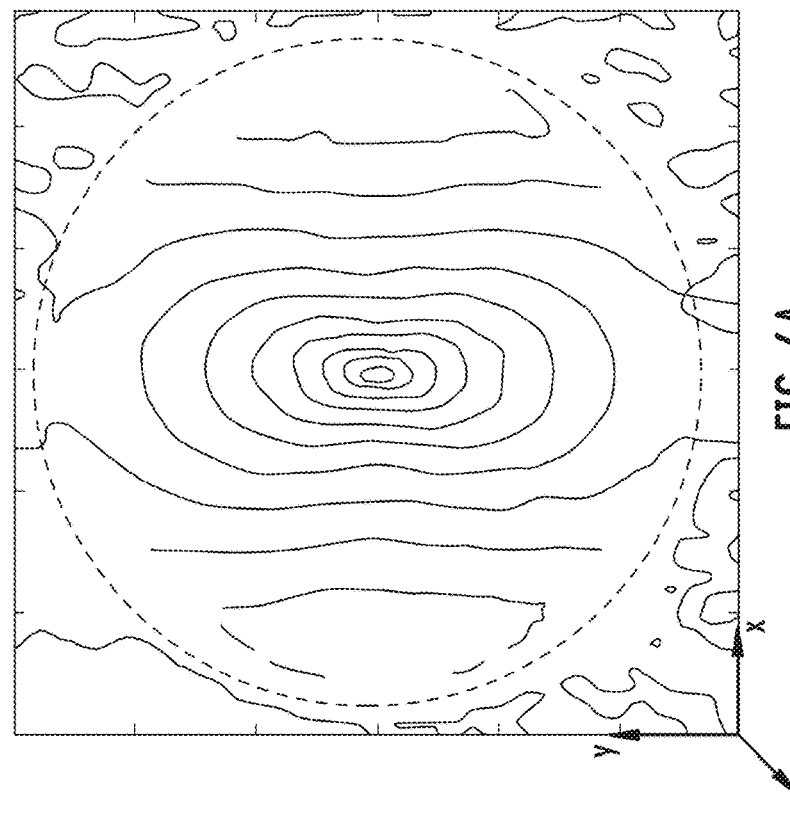

As discussed above, the imaging system 200 may utilize the slopes $$\frac{\partial w}{\partial x} \text{ and } \frac{\partial w}{\partial y}$$

to determine various other geometric characteristics of the reflective surface 110 of the specimen 102. For example, in the illustrative embodiment, the imaging system 200 utilizes numerical differentiation and/or another suitable algorithm or technique to determine various curvatures of the reflective surface 110 (e.g., directional curvatures and/or twist curvatures) based on the determined slopes. It should be appreciated that it may be desirable to determine the curvatures for any number of reasons including, for example, to determine the imposed or residual stress in a reflective substrate (e.g., a silicon wafer) which, if too high, may damage the substrate over time (e.g., by cracking). In particular, the imaging system 200 may calculate the directional curvature $$\frac{\partial^2 w}{\partial x^2}$$

according to $$\frac{\partial^2 w}{\partial x^2} = \frac{1}{2}\frac{\partial}{\partial x}\left(\frac{\delta_x}{\Delta}\right),$$

which is represented by the contour diagram 602 of FIG. 6A. Similarly, the imaging system 200 may calculate the directional curvature $$\frac{\partial^2 w}{\partial y^2}$$

according to $$\frac{\partial^2 w}{\partial y^2} = \frac{1}{2}\frac{\partial}{\partial y}\left(\frac{\delta_y}{\Delta}\right),$$

which is represented by the contour diagram 604 of FIG. 6B.

Figure 7B:
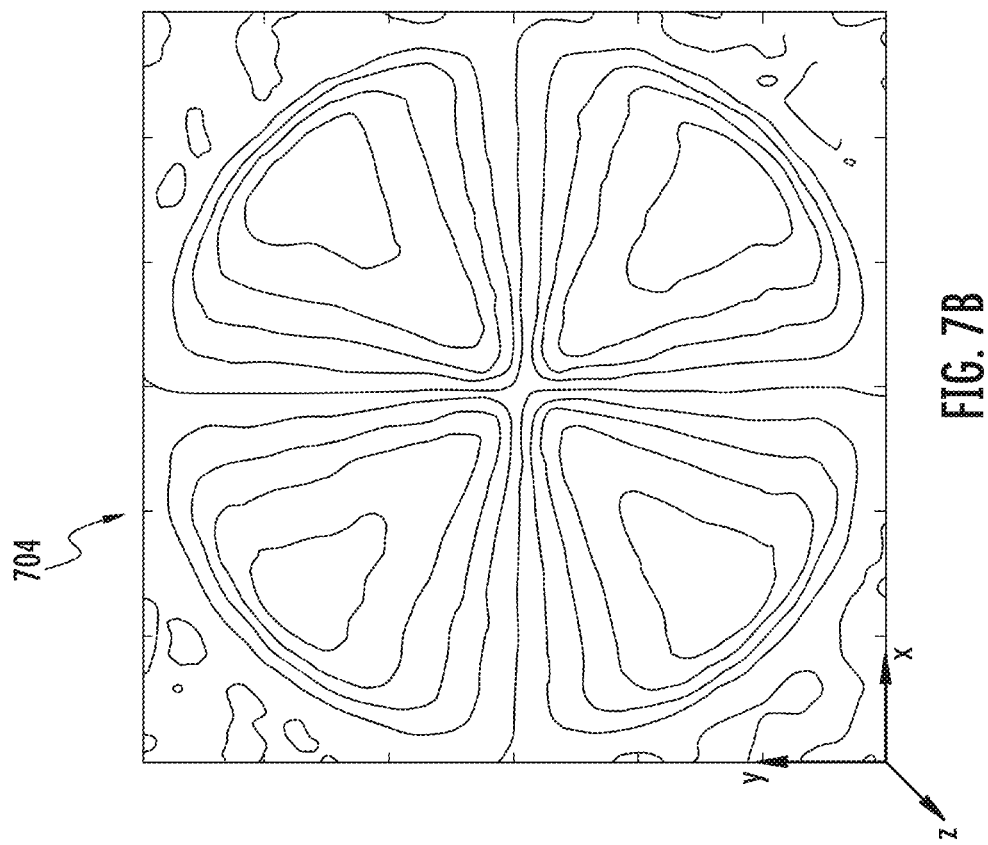
FIGS. 7A and 7B are simplified contour diagrams of determined twist curvatures of the surface of the specimen of FIGS. 1A and 1B.
Figure 7A:
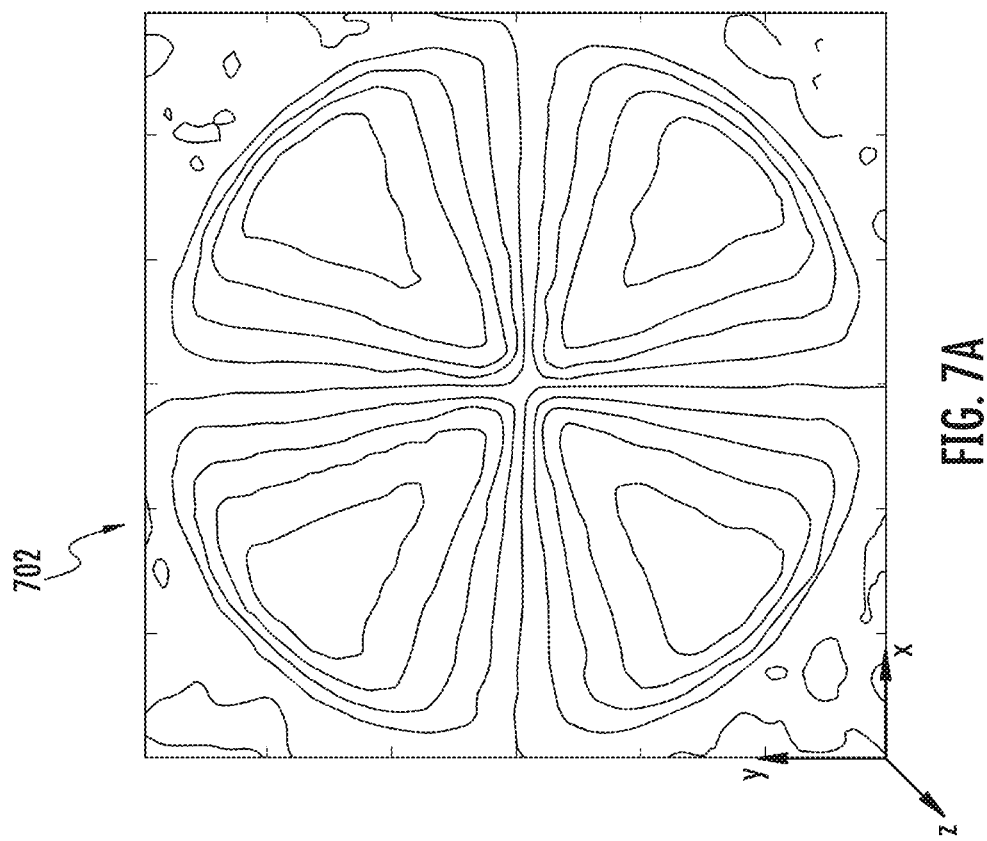

In some embodiments, the imaging system 200 may also utilize cross-partial differentiation to determine the twist curvature of the reflective surface 110 of the specimen 102. Specifically, the imaging system 200 may determine the twist curvature $$\frac{\partial^2 w}{\partial x \partial y}$$

according to $$\frac{\partial^2 w}{\partial x \partial y} = \frac{1}{2}\frac{\partial}{\partial x}\left(\frac{\delta_y}{\Delta}\right),$$

which is represented by the contour diagram 702 of FIG. 7A. Similarly, the imaging system 200 may determine the twist curvature $$\frac{\partial^2 w}{\partial y \partial x}$$

according to $$\frac{\partial^2 w}{\partial y \partial x} = \frac{1}{2}\frac{\partial}{\partial y}\left(\frac{\delta_x}{\Delta}\right),$$

which is represented by the contour diagram 704 of FIG. 7B. It will be appreciated that the contour diagrams 702, 704 are nearly identical, which is expected from the cross-partial differentiation of continuous functions (i.e., the surface topography of the reflective surface 110).

In the illustrative embodiment, the imaging system 200 also utilizes numerical integration and/or another suitable algorithm of technique to determine the surface topography of the reflective surface 110 (i.e., its shape) based on the determined slopes. For example, the imaging system 200 may integrate the determined x-directional slope $$\frac{\partial w}{\partial x}$$

over x in a region of interest between limits a and b (e.g., the entire surface 110 of the specimen 102) to determine the surface topography of the reflective surface 110. In particular, the imaging system 200 may determine the surface topography as $$\int_a^b \frac{\partial w}{\partial x} dx.$$

The imaging system 200 may also determine the surface topography of the reflective surface 110 in terms of the y-directional slope $$\frac{\partial w}{\partial y}$$

as $$\int_a^b \frac{\partial w}{\partial y} dy.$$

Figure 8B:
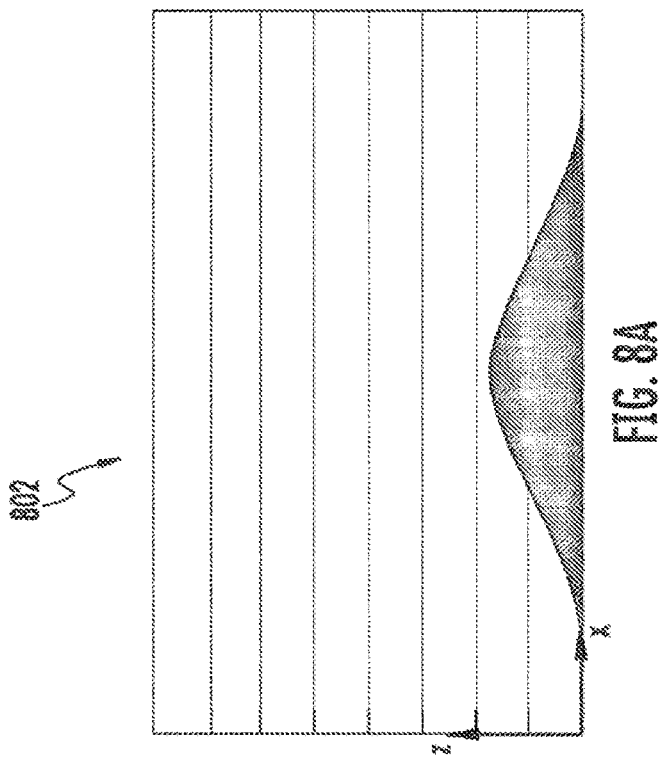
FIGS. 8A and 8B are simplified two-dimensional diagrams of a determined surface topography of the surface of the specimen of FIGS. 1A and 1B.
Figure 8A:
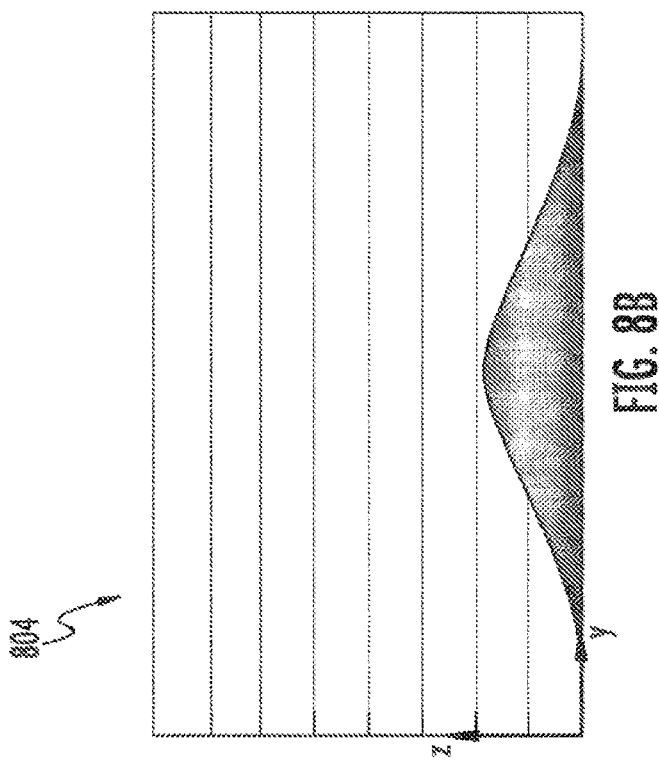
Figure 9A:
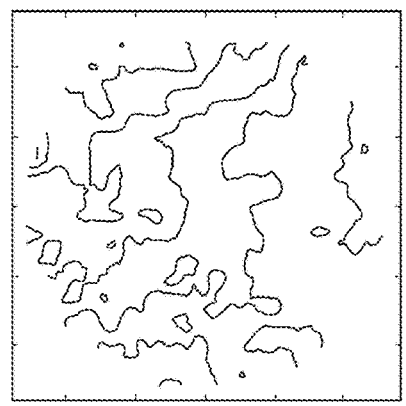
FIGS. 9A-9D and 10A-D are simplified contour diagrams of determined slopes of the surface of the specimen of FIGS. 1A and 1B monitored over a period of time during a process applied to the specimen.
Figure 10A:
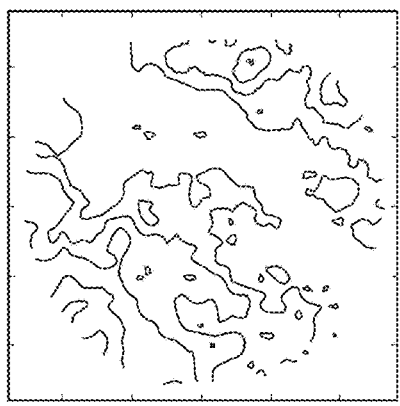
Figure 9B:
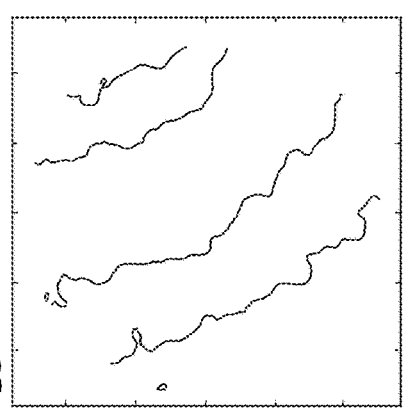
Figure 10B:
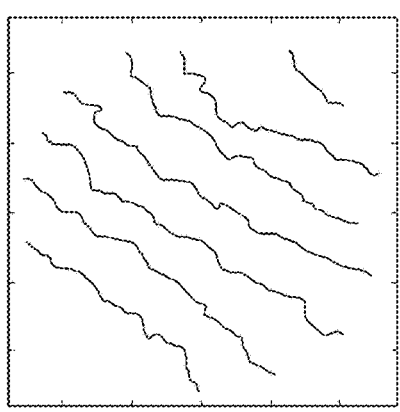
Figure 9C:
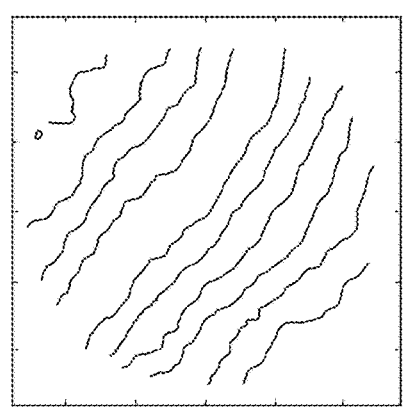
Figure 10C:
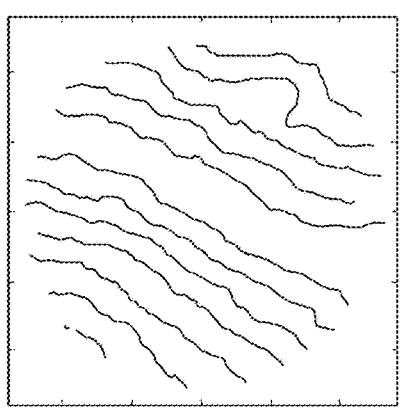
Figure 9D:
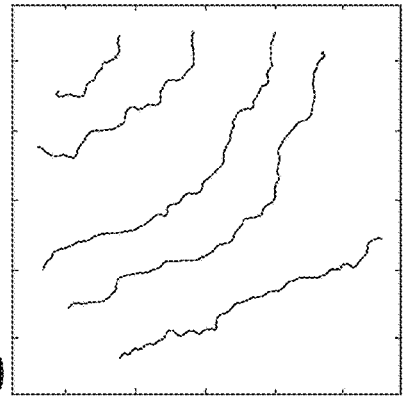
Figure 10D:
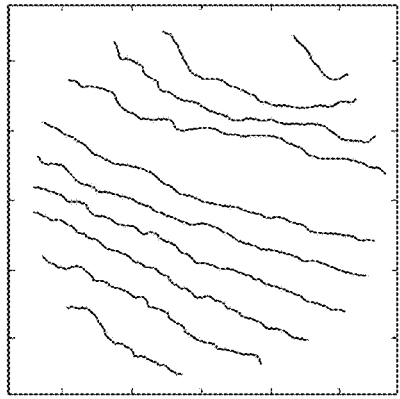

As shown in FIGS. 8A and 8B, the diagrams 802, 804 represent the determined surface topology of the reflective surface 110 according to integration in terms of x and integration in terms of y, respectively. As expected, the diagrams 802, 804 are nearly identical (with any deviation resulting from numerical, rounding, and/or other system errors).

In some embodiments, the imaging system 200 may determine various geometric characteristics of the reflective surface 110 of the specimen 102 over time (e.g., during a process). For example, in an embodiment, a polymer film (e.g., an epoxy film) may be applied to a silicon wafer, and the imaging system 200 may determine the surface slopes of the silicon wafer at various point in time as the polymer film cures on the wafer. Referring now to FIGS. 9A-10D, various contour diagrams are shown that represent those surface slopes. In particular, a contour diagram 902 represents the local slope $$\frac{\partial w}{\partial x}$$

of the reflective surface 110 of the silicon wafer at a first point in time (e.g., after 25 minutes from application of the polymer film). Similarly, a contour diagram 904 represents the local slope $$\frac{\partial w}{\partial x}$$

of the reflective surface 110 of the silicon wafer at a second later point in time (e.g., 35 minutes). Further, a contour diagram 906 represents the local slope $$\frac{\partial w}{\partial x}$$

of the reflective surface 110 of the silicon wafer at a third even later point in time (e.g., 45 minutes), and a contour diagram 908 represents the local slope $$\frac{\partial w}{\partial x}$$

of the reflective surface 110 at a fourth even later point in time (e.g., 55 minutes). Similarly, contour diagrams 1002, 1004, 1006, 1008 represent the local slope $$\frac{\partial w}{\partial y}$$

of the reflective surface 110 of the silicon wafer at the first point in time, at the second point in time, at the third point in time, and at the fourth point in time, respectively. It will be appreciated that the slopes $$\frac{\partial w}{\partial x} \text{ and } \frac{\partial w}{\partial y}$$

initially appear somewhat awry but converge to distinct slopes values over time, because the magnitudes of the slopes increase with time as the curing epoxy bends the silicon wafer in space.

Referring now to FIG. 11, a simplified schematic diagram of one illustrative embodiment of a system 1100 for determining characteristics of transparent materials is shown. As shown, the illustrative system 1100 is similar to the system 150 described above and shown in FIG. 1B. As for the system 150, the system 1100 includes a target structure 104, a beam splitter 106, and a camera 108. However, instead of a specimen 102 with a reflective front surface 110, the system 1100 includes a transparent specimen 1102, allowing light 112 to pass through the specimen 1102 and reflect off of a reflective surface 1104. As described in more detail below, the reflective surface 1104 may be on separate structure that is flush with the specimen 1102 or may be a coating on the back of the specimen 1102. In use, as discussed in more detail below, the system 1100 is configured to determine angular deflection of light caused by static or dynamic stresses in the specimen 1102. More specifically, in the illustrative embodiment, the system 1100 employs optical metrology (i.e., uses light as a measuring probe) to determine angular deflections caused by stress gradients in the specimen 1102. The determined angular deflections can be used to determine the stress gradients in the specimen 1102.

The illustrative specimen 102 may be embodied as any structure that is transparent at one or more wavelengths that the camera 108 is sensitive to. Each other illustrative component of FIG. 11 such as the target structure 104, the beam splitter 106, the camera 108, etc., may be similar to the corresponding component of FIG. 1B described above, the description of which will not be repeated in the interest of clarity.

Referring now to FIGS. 12A-12C, various embodiments of a reflective surface for a specimen are shown. In FIG. 12A, the specimen 102 of the system 150 has a front reflective surface 110, as described above in regard to FIG. 1B. In contrast, the specimen 1102 of the system 1100 does not have a reflective surface on the front of the specimen 1102 but rather has a reflective surface 1104 that is on or adjacent the back surface of the specimen 1102. In one embodiment, a substrate 1202 with a reflective surface 1104 is placed flush with the rear surface of the specimen 1102, as shown in FIG. 12B. Alternatively, in some embodiments, a reflective coating 1104 may be deposited on the specimen 1102, as shown in FIG. 12C.

Figure 13:
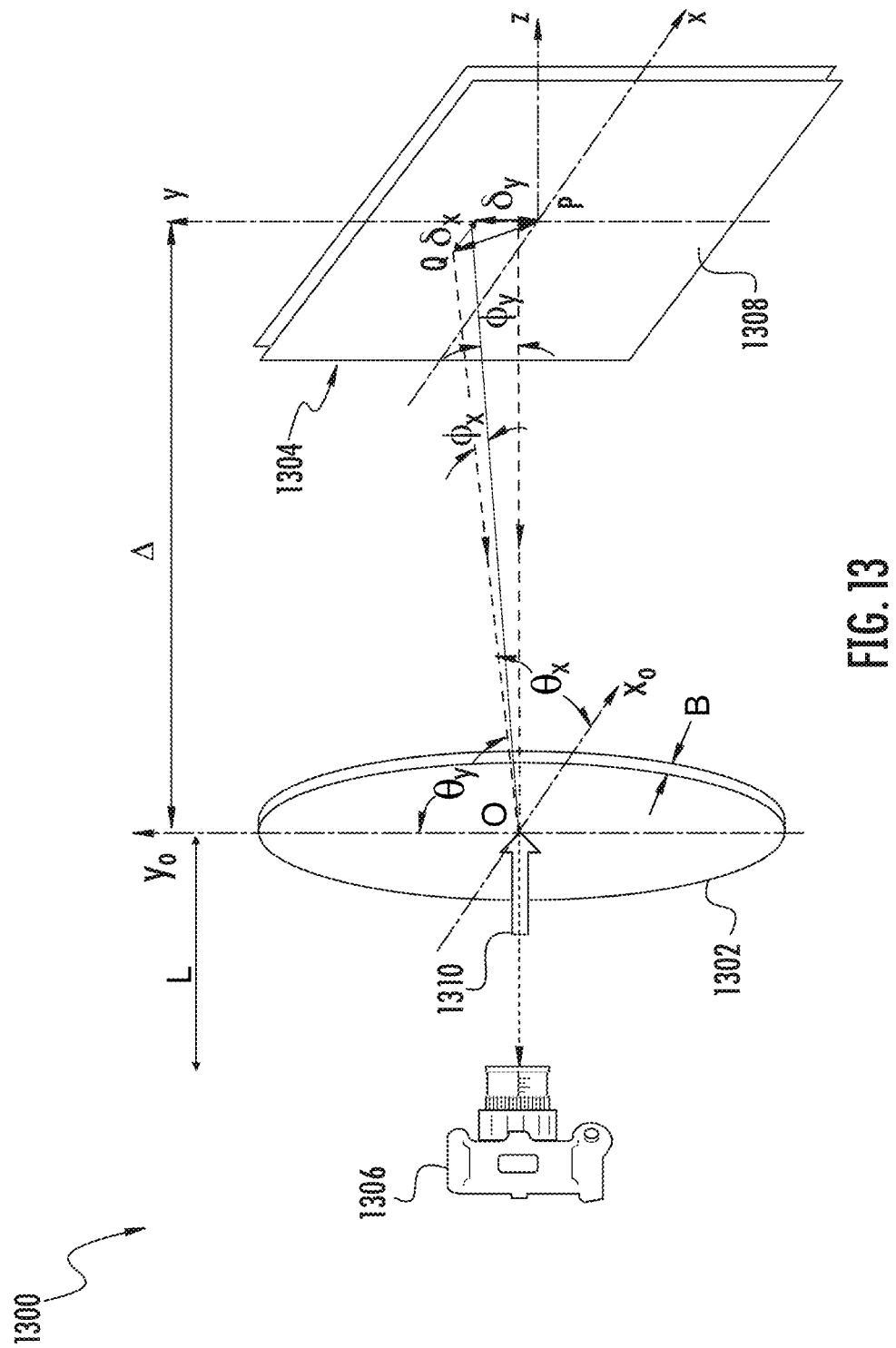
FIG. 13 is a simplified three-dimensional spatial diagram illustrating a transmission Discrete Gradient Sensing system.

In order to analyze the angular deflection caused by a double-pass through the specimen 1102, an analysis of a single transmission Digital Gradient Sensing (t2-DGS) will first be considered. Referring now to FIG. 13, in one embodiment, a transparent specimen 1302 is positioned between a target structure 1304 and a camera 1306. The target structure has a speckled surface 1308 with several light and dark regions. With no force applied to the specimen, light from point P on the target structure 1304 pass through or near point O on the specimen 1302 towards the camera 1306 to be imaged onto one or more pixels of the camera 1306. When a force (such as force 1310) is applied to the specimen 1302, stresses in the specimen 1302 cause light from point Q to be deflected as it passes through the specimen 1302 near the point O. Light from point Q can then be imaged on the same pixels of the camera 1306 that previously imaged point P. The point Q is a distance $\delta_x$ away from P in the x-direction and a distance $\delta_y$ away from P in the y-direction, where the z-axis is along the line between points O and P and the x- and y-axes are perpendicular to the z-axis, as shown in FIG. 13. The line from O to Q is deflected by an angle $\phi_x$ about the y-axis and by an angle $\phi_y$ about the x-axis relative to the line from O to P.

The optical path change, $\delta S$, between the original light ray OP and deflected light ray OQ caused by the deformation of the specimen 1302, can be expressed as:

$$\delta S(x,y) = 2B(n-1)\int_0^{1/2}\varepsilon_{zz}d\left(\frac{z}{B}\right) + \int_0^{1/2}\delta n\,d(z/B). \quad \text{Eq. (1)}$$

The two integrals on the right hand side of the above equation represent the contributions of the normal strain in the thickness direction, $\varepsilon_{zz}$, and the change in the refractive index, $\delta n$, to the overall optical path, respectively. The Maxwell-Neumann relationship states that the refractive index change is proportional to the local state of normal stresses in the specimen. The strain, $\varepsilon_{zz}$, can be related to the normal stresses using the generalized Hooke's law for an isotropic, linear elastic solid. Thus, for plane stress conditions, Eq. (1) reduces to:

$$\delta S(x,y) = C_\sigma B(\sigma_{xx} + \sigma_{yy}), \quad \text{Eq. (2)}$$

where $C_\sigma = D_1 - (v/E)(n-1)$ is the elasto-optic constant of the specimen material.

The deflected light ray OQ make solid angles $\theta_x$ and $\theta_y$ with the x- and y-axes, respectively, as shown in FIG. 13. It is evident from the above equations that, for small angular deflections, the direction cosines of OQ, $\cos\theta_{x:y}$, are related to the in-plane stress gradients as:

$$\cos\theta_{x:y} = \frac{\partial(\delta S)}{\partial(x:y)} = C_\sigma B \frac{\partial(\sigma_{xx} + \sigma_{yy})}{\partial(x:y)}. \quad \text{Eq. (3)}$$

Referring to the planes defined by points OAQ and OCQ shown in FIG. 13, $$\cos\theta_{x:y} = \frac{\partial_{x:y}}{R}, \quad \text{Eq. (4)}$$

where $R(=\sqrt{\Delta^2 + \partial_x^2 + \partial_y^2})$ is the distance between points O and Q and $\Delta$ is the distance between the specimen 1302 and target structure 1304. For small angular deflections, or $\partial_{x:y} \gg \Delta$, the two angular deflections of light rays, $\phi_{x:y}$, are related to the in-plane stress gradients as:

$$\phi_{x:y} \approx \frac{\delta_{x:y}}{\Delta} \approx \cos\theta_{x:y} = C_\sigma B \frac{\partial(\sigma_{xx} + \sigma_{yy})}{\partial(x:y)}. \quad \text{Eq. (5)}$$

A pin-hole camera mapping function can be used to transfer the coordinates of the target plane to the specimen plane.

Figure 14:
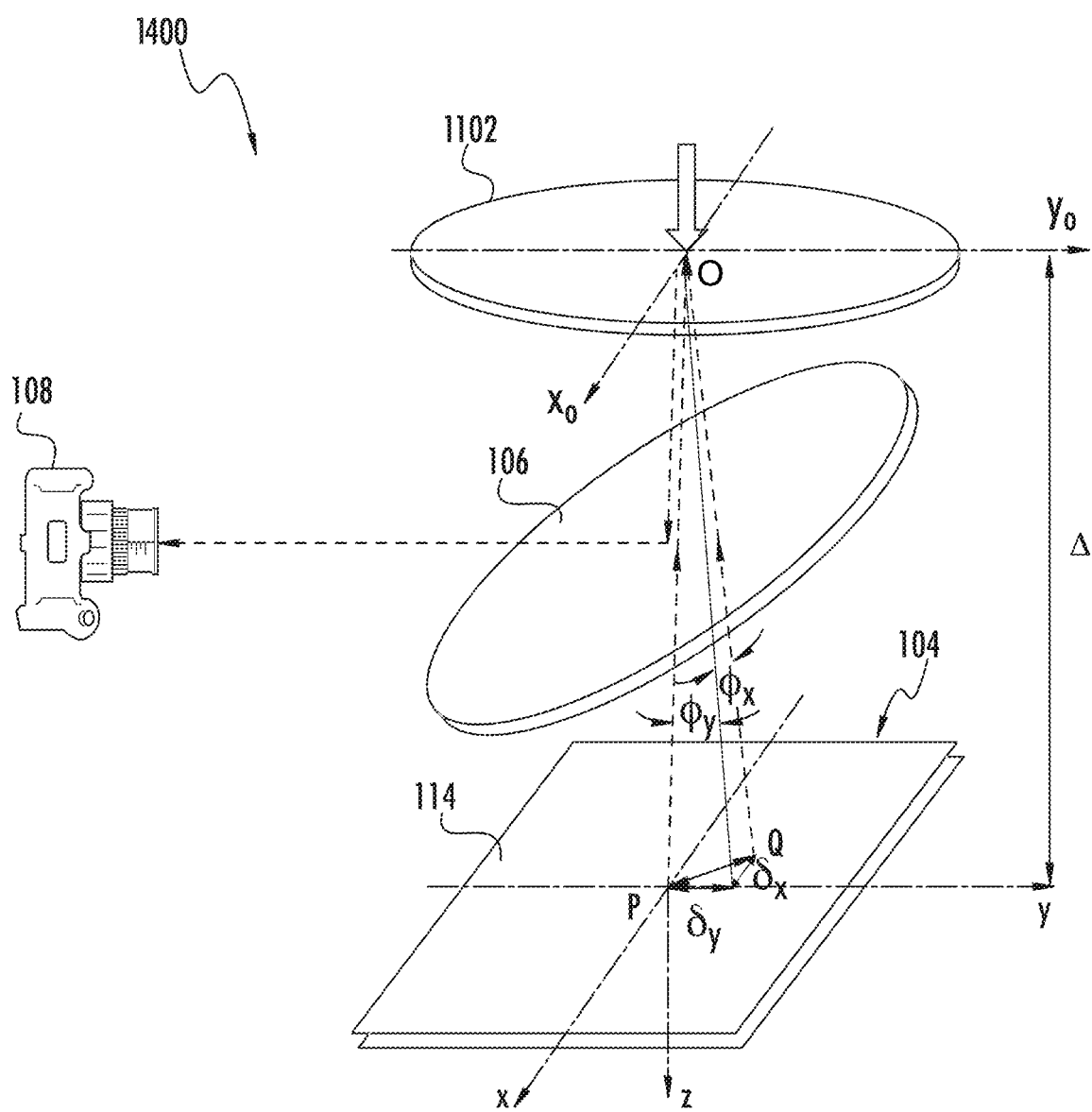
FIG. 14 is a simplified three-dimensional spatial diagram illustrating an optical path from a target structure to a camera of a system for determining characteristics of a transparent material.

Referring now to FIG. 14, an analysis of a double transmission Digital Gradient Sensing (t2-DGS) will be considered. The system 1400 shown in FIG. 14 has similar components to those of the system 1100 shown in FIG. 11, which will not be repeated in the interest of clarity. In one embodiment of the system 1400, a substrate (not shown) with a reflective surface is placed on top of the specimen 1102 such that light coming from the target structure 114 passes through the specimen 1102, is reflected off of the reflected surface, passes through the specimen 1102 again, and is then received by the camera 108. The local displacements $\delta_{x:y}$ can be measured by correlating a reference image with the deformed images. Thus, light rays experience the elasto-optical effects over twice the specimen thickness as a result of retro-reflection immediately after leaving the rear face. Hence, the optical path change here is twice that of t-DGS analyzed above in regard to FIG. 13:

$$\delta S_{t2\text{-}DGS} = 2(\delta S_{t\text{-}DGS}). \quad \text{Eq. (6)}$$

The two angular deflections of light rays of t2-DGS $(\phi_{x:y})_{t2\text{-}DGS}$, which are related to the in-plane stress gradients, can be then be expressed as:

$$(\phi_{x:y})_{t2\text{-}DGS} = 2(\phi_{x:y})_{t\text{-}DGS} = 2C_\sigma B \frac{\partial(\sigma_{xx} + \sigma_{yy})}{\partial(x:y)} \quad \text{Eq. (7)}$$

From the above, it is evident that the sensitivity of t2-DGS is twice that of t-DGS.

Figure 15A:
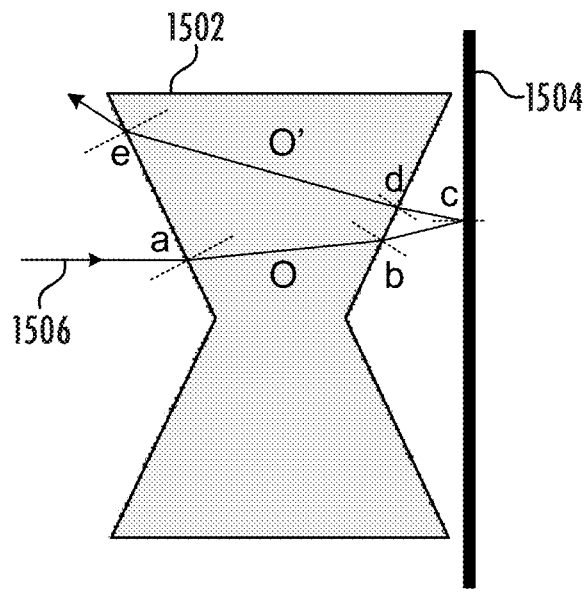
FIG. 15A is a simplified diagram illustrating an optical path through a specimen with an adjacent reflective surface.

A 2D ray diagram of the t2-DGS methodology is shown in FIG. 15A. A specimen 1502 undergoes a deformation from a planar shape due to a force, as shown in FIG. 15A (the magnitude of the deformation is exaggerated in the figure). A substrate 1504 with a reflective surface is positioned next to the specimen 1502. A light ray 1506 enters the deformed specimen 1502 and refracts at point 'a'. The light ray 1506 continues to bend as it propagates through the specimen 1502 due to continuous local refractive index changes and exits the deformed specimen 1502 at point 'b'. Next, the light ray 1506 reflects off the reflective surface of the detached substrate at point 'c,' enters the deformed specimen again, and refracts at point 'd'. After a second transmission through the specimen 1502, the light ray 1506 exits the specimen 1502 at point 'e.' In t-DGS, the angular deflection is assumed to occur at point O along the centerline of the specimen 1502 instead of 'a' or 'b' after all the refraction and thickness changes are lumped together. In t2-DGS, however, the light ray 1506 ray reflected off the reflective surface of the substrate 1504 passes through O' during the second transmission. The distance OO' is assumed to be negligible in the analysis. If the detached reflective surface is not kept flush with the specimen, parallelism of the reflector relative to the undeformed specimen cannot be assured and additional calculations may be necessary.

Figure 15B:
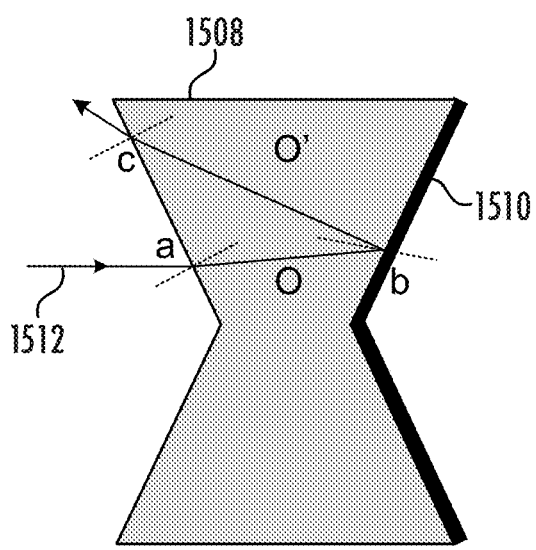
FIG. 15B is a simplified diagram illustrating an optical path through a specimen with a rear reflective surface.

Referring back to FIG. 14, in some embodiments, the specimen 1102 may have a reflective surface coated directly onto the top side of the specimen 1102. In such an embodiment, the reflective surface will deform along with the surface of the specimen 1102, as shown in FIG. 15B. The deformation of the reflective surface will cause a further deflection of light rays. Such a configuration may be referred to as transmission-reflection Digital Gradient Sensing (tr-DGS). As before, the local speckle displacements $\delta_{x:y}$ can be quantified by correlating the reference image with the deformed image of the specimen.

In r-DGS, described above in regard to FIG. 1, the reflective surface deforms when the specimen is stressed. In t2-DGS, the refractive index and thickness of the specimen change when the specimen is stressed. The tr-DGS method combines r-DGS and t2-DGS. That is, in tr-DGS, the refractive index and thickness of the specimen change, and the reflective rear surface of specimen also deforms when the specimen is stressed, which makes tr-DGS more sensitive for the same stress field as these effects are additive in nature. Hence, the angular deflections of light rays of tr-DGS $(\phi_{x:y})_{tr\text{-}DGS}$ is a combination of r-DGS $(\phi_{x:y})_{r\text{-}DGS}$ and t2-DGS $(\phi_{x:y})_{t2\text{-}DGS}$:

$$(\phi_{x:y})_{tr\text{-}DGS} = \frac{\delta_{x:y}}{\Delta} = (\phi_{x:y})_{r\text{-}DGS} + (\phi_{x:y})_{t2\text{-}DGS}. \quad \text{Eq. (8)}$$

As noted earlier, $$\phi_{x:y} = 2\frac{\partial w}{\partial(x:y)}, \quad \text{Eq. (9)}$$

and for plane stress, $$\varepsilon_{zz} \approx \frac{2w}{B} = -\frac{v}{E}(\sigma_{xx} + \sigma_{yy}),$$

and hence $$w \approx -\frac{vB}{2E}(\sigma_{xx} + \sigma_{yy}), \quad \text{Eq. (10)}$$

where v is the Poisson's ratio, B is the undeformed thickness of the specimen 1102, and E is the elastic modulus of the specimen 1102. Hence, Eq. (8) can be written as, $$(\phi_{x:y})_{tr\text{-}DGS} = \frac{\delta_{x:y}}{\Delta} = \left(2C_\sigma B - \frac{vB}{E}\right)\frac{\partial(\sigma_{xx} + \sigma_{yy})}{\partial(x:y)}. \quad \text{Eq. (11)}$$

A 2D ray diagram of the tr-DGS methodology is shown in FIG. 15B. A specimen 1508 undergoes a deformation from a planar shape due to a force, as shown in FIG. 15B (the magnitude of the deformation is exaggerated in the figure). The specimen 1508 has a reflective coating 1510 on the back surface, which deforms with the rest of the specimen 1508. An incident ray 1512 enters the deformed specimen 1508 and refracts at point 'a'. The ray 1512 continues to bend progressively as it propagates through the thickness due to refractive index changes. Next, the ray 1512 reflects off the deformed rear reflective surface 1510 at point 'b' according to the laws of reflection and reenters the specimen 1508. At last, the ray 1512 exits the specimen 1508 after refraction at point 'c.'

Figure 16:
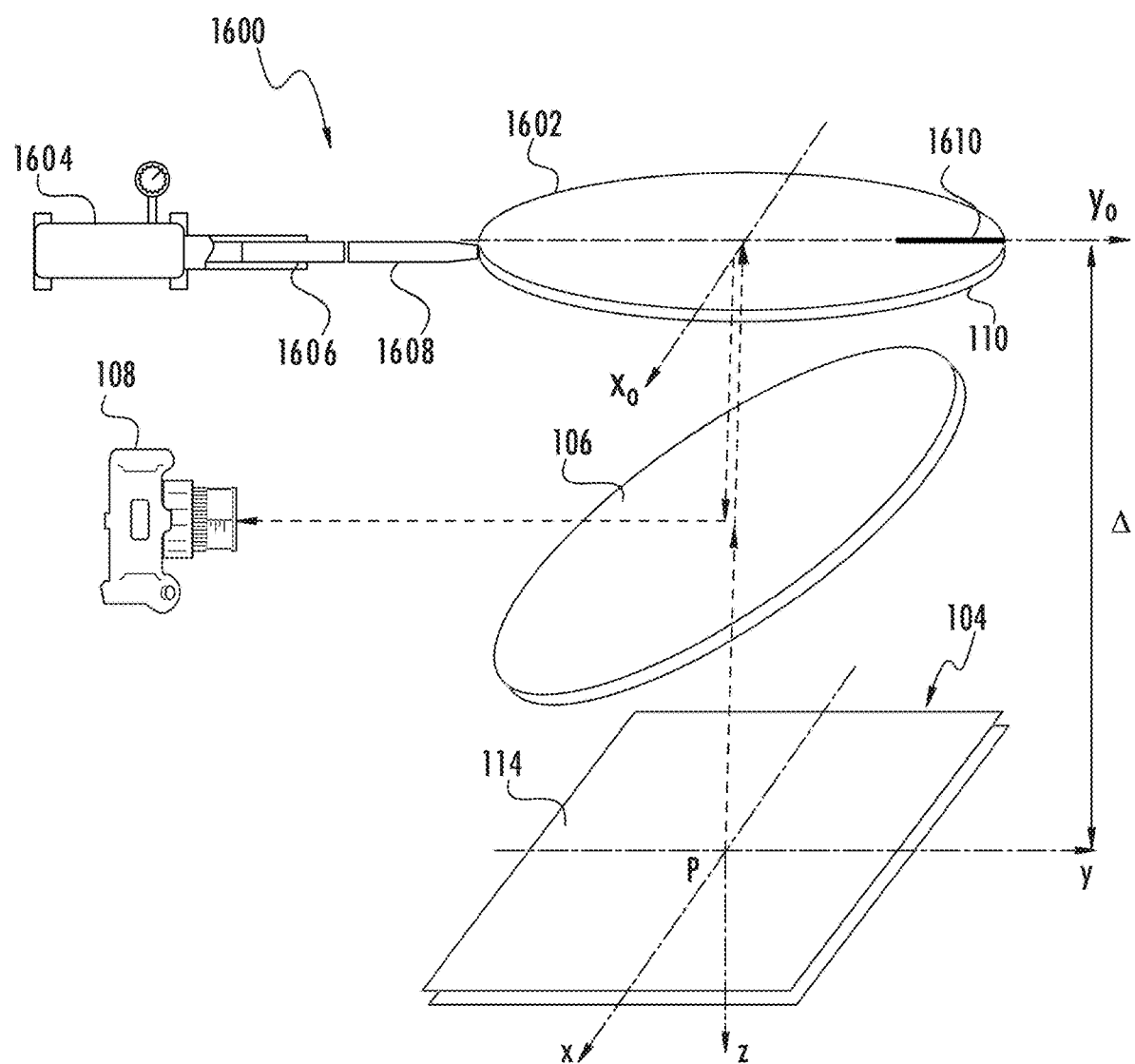
FIG. 16 is a simplified three-dimensional spatial diagram illustrating a striker configured to impact a specimen of a system for determining characteristics of a transparent material.

It should be appreciated that the techniques described above can be used to measure dynamic stresses using a high-speed camera. For example, referring now to FIG. 16, a system 1600 for monitoring dynamic stresses in a transparent material is shown. The system 1600 includes a transparent specimen 1602 as well as various other components similar to those of FIG. 1B presented above, the description of which will not be repeated in the interest of clarity. The transparent specimen 1602 has a reflective surface adjacent the top surface of the specimen 1602, as described above in more detail. The system 1600 includes a gas gun 1604 to propel a striker 1606 into a long arm 1608, which then impacts the specimen 1602. In the illustrative embodiment a crack 1610 is created in the specimen 1602 prior to the impact from the long arm 1608. When the long arm 1608 impacts the specimen 1602, the camera 108 monitors the stress of the specimen 1602, allowing for observation of stress gradients in the region of the crack tip.

Figure 17A:
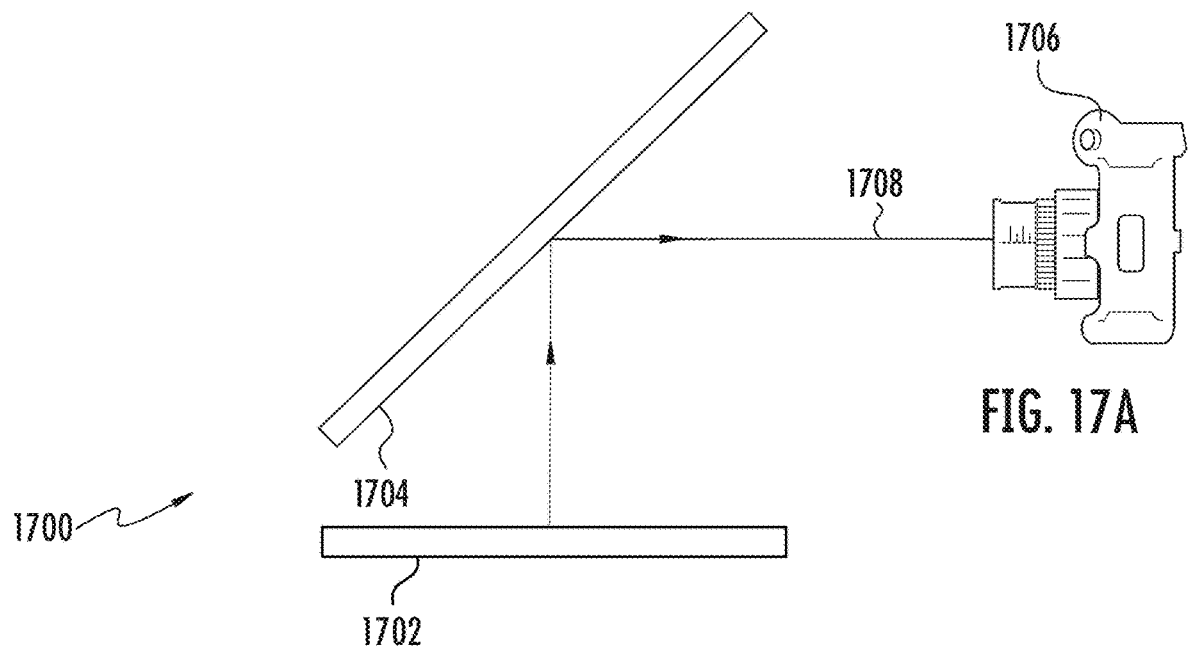
FIG. 17A is a simplified schematic diagram of an embodiments of a system for determining geometric characteristics of reflective surfaces.

Referring now to FIG. 17A, a simplified schematic diagram of one illustrative embodiment of a system 1700 for determining geometric characteristics of a reflective surface is shown. As shown, the illustrative system 1700 is similar to the system 150 described above and shown in FIG. 1B. As for the system 150, the system 1700 includes a target structure 1702, a specimen 1704 with a reflective surface, and a camera. However, instead of using a beamsplitter to allow light to be incident on each of the target structure 1702, specimen 1704, and camera 1706 to be at approximately 90 degrees, a beamsplitter is not used and the light is incident on the specimen 1704 at an oblique angle, such as 45 degrees.

The illustrative specimen 102 may be embodied as any structure that is transparent at one or more wavelengths that the camera 108 is sensitive to. Each other illustrative component of FIG. 11 such as the target structure 104, the beam splitter 106, the camera 108, etc., may be similar to the corresponding component of FIG. 1B described above, the description of which will not be repeated in the interest of clarity.

Figure 17B:
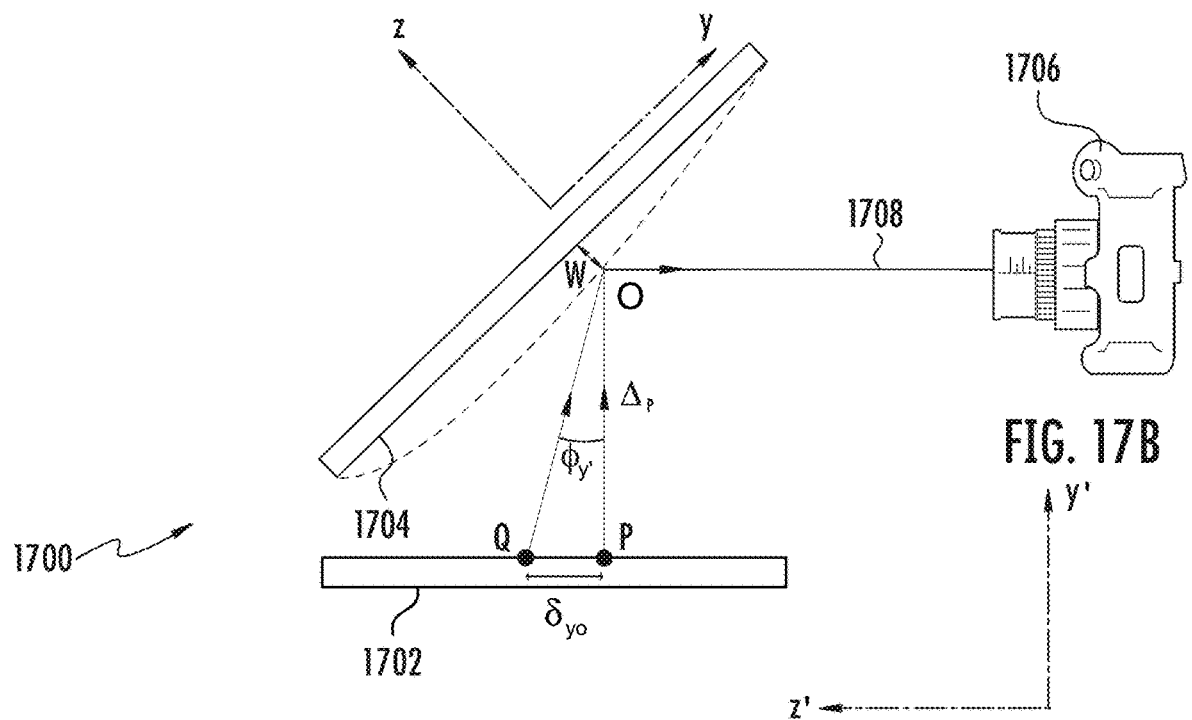
FIG. 17B is a simplified schematic diagram illustrating an optical path from a target structure to a camera of the system of FIG. 17A.

The angular deflections of light rays are shown in FIG. 17(b). When the specimen 1704 is in the undeformed state, a generic point P on the target structure 1702 is photographed by a pixel of the camera 1706 through point O on the specimen plane. Thus, the recorded image at that time instant and/or load level is the reference image. After the specimen suffers deformation, say, due to an applied load, a neighboring point of P, namely Q on the target structure 1702 is photographed by the same pixel through the same point O on the specimen surface. The corresponding image of the specimen in the deformed state is recorded next as an assembly of all such individual pixels. The local orthogonal speckle displacements $\{\delta_{yo}, \delta_{xo}\}$ can be obtained by performing a 2D image correlation of the reference and deformed images. The corresponding angles $\{\phi_{y'}, \phi_{x'}\}$ represent two orthogonal angular deflections of light rays where primes denote coordinates relative to the orientation of the camera 1706 and target structure 1702, as shown in FIG. 17B (both x and x' axis are coming out of the page). It should be noted that, the out-of-plane deformation (w) is along the z-axis of the specimen coordinates (x, y, z). However, the images recorded by the camera are in the (x', y', z') coordinates. The details of these two coordinate systems are shown in FIG. 17B. From the figure it can be observed that:

$$\frac{w'}{w} = \frac{y'}{y} = \cos\alpha, \quad x' = x,$$

where $\alpha$ is the angle between the y and y' axes. In the embodiment shown in FIG. 17B, $\alpha$ is 45 degrees, so $$\frac{w'}{w} = \frac{1}{\sqrt{2}}.$$

as

Hence, $\{\phi_{y'}, \phi_{x'}\}$ is related to $$\left\{\frac{\partial w'}{\partial y'}, \frac{\partial w'}{\partial x'}\right\}$$

as $$\frac{\partial w'}{\partial y'} = \frac{1}{2}\tan(\phi_{y'}) \approx \frac{1}{2}(\phi_{y'}) \approx \frac{1}{2}\frac{\delta_{yo}}{\Delta_P}$$

$$\frac{\partial w'}{\partial x'} = \frac{1}{2}\tan(\phi_{x'}) \approx \frac{1}{2}(\phi_{x'}) \approx \frac{1}{2}\frac{\delta_{xo}}{\Delta_P}$$

where $\Delta P$ is the local gap (distance) between the specimen and target planes at point P. Next, $$\left\{\frac{\partial w'}{\partial y'}, \frac{\partial w'}{\partial x'}\right\}$$

needs to be transformed to obtain the specimen surface slopes, $$\left\{\frac{\partial w}{\partial y}, \frac{\partial w}{\partial x}\right\},$$

using the equations above as:

$$\frac{\partial w}{\partial y} = \frac{\partial(\sqrt{2}\,w')}{\partial(\sqrt{2}\,y')} = \frac{\partial w'}{\partial y'} \approx \frac{1}{2}\left(\frac{\delta_{yo}}{\Delta_P}\right)$$

$$\frac{\partial w}{\partial x} = \frac{\partial\sqrt{2}\,w'}{\partial x'} = \sqrt{2}\frac{\partial w'}{\partial x'} \approx \frac{\sqrt{2}}{2}\left(\frac{\delta_{xo}}{\Delta_P}\right) = \frac{1}{\sqrt{2}}\left(\frac{\delta_{xo}}{\Delta_P}\right)$$

It should be noted that the experimental setup shown here has the specimen rotated about the x-axis, which had led to $x=x'$, $y=\sqrt{2}y'$, but $$\frac{\partial w}{\partial y} = \frac{\partial w'}{\partial y'}, \quad \frac{\partial w}{\partial x} = \sqrt{2}\frac{\partial w'}{\partial x'}.$$

Also, it can be concluded that when the setup is rotated about the y-axis instead, the governing equations will be $x=\sqrt{2}x'$, $y=y'$, and $$\frac{\partial w}{\partial y} = \sqrt{2}\frac{\partial w'}{\partial y'}, \quad \frac{\partial w}{\partial x} = \frac{\partial w'}{\partial x'}.$$

As noted earlier, in this simplified r-DGS method, the angle $\alpha$, between the specimen and target planes is selected to be 45°. If any other convenient angle is more suitable ($0°<\alpha<90°$), is theoretically acceptable although 45° is relatively straightforward and often more suitable. It is important to note that the coordinates of the specimen plane are utilized for describing the governing equations and the camera 1706 is focused on the target plane during photography. Therefore, a coordinate mapping is needed to transfer the target plane locations to the specimen plane.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A system for determining characteristics of transparent materials, the system comprising: a transparent specimen comprising a front surface and a back surface, wherein the back surface has a reflective coating; a target structure comprising a surface with a plurality of light regions and a plurality of dark regions, wherein the plurality of light regions and the plurality of dark regions are randomly distributed across the surface of the target structure; and a camera; and a beamsplitter configured to direct light (i) from the target structure to the transparent specimen and (ii) from the transparent specimen to the camera; wherein the camera is configured to capture an image of the target structure using light from the target structure that (i) reflects off of the beamsplitter, (ii) passes through the transparent specimen and reflects off of the reflective surface, and (iii) passes through the beamsplitter" has been changed to—A system for determining characteristics of a transparent specimen, the system comprising:

the transparent specimen comprising a front surface and a back surface, wherein the back surface has a reflective coating;

a target structure comprising a surface with a plurality of light regions and a plurality of dark regions, wherein the plurality of light regions and the plurality of dark regions are randomly distributed across the surface of the target structure;

a camera; and a beamsplitter configured to direct light (i) from the target structure to the transparent specimen and (ii) from the transparent specimen to the camera;

wherein the camera is configured to capture an image of the target structure using light from the target structure that (i) reflects off of the beamsplitter, (ii) passes through the transparent specimen and reflects off of the reflective coating, and (iii) passes through the beamsplitter.

2. The system of claim 1, further comprising a broad spectrum white light source configured to illuminate the target structure, wherein the camera is configured to capture the image using light from the broad spectrum white light source.

3. The system of claim 1, further comprising a striker configured to apply a force to the specimen.

4. The system of claim 3, wherein the camera is configured to capture the one or more images after the striker applies the force to the specimen.

5. The system of claim 1, wherein the specimen has a crack.

* * * * *